United States Patent
Carlson et al.

(10) Patent No.: US 10,527,722 B2
(45) Date of Patent: Jan. 7, 2020

(54) RADAR SENSOR SYSTEM PROVIDING SITUATIONAL AWARENESS INFORMATION

(71) Applicant: Garmin Switzerland GmbH, Schaffhausen (CH)

(72) Inventors: Kenneth A. Carlson, Gardner, KS (US); Nolan van Heerden, Stellenbosch (ZA); Todd C. Sherman, Olathe, KS (US); Andrew C. Silver, Bexhill (GB); Ross G. Stirling, Cochrane (CA)

(73) Assignee: Garmin Switzerland GmbH (CH)

( * ) Notice: Subject to any disclaimer, the term of this patent is extended or adjusted under 35 U.S.C. 154(b) by 516 days.

(21) Appl. No.: 15/172,377

(22) Filed: Jun. 3, 2016

(65) Prior Publication Data

US 2016/0363665 A1    Dec. 15, 2016

Related U.S. Application Data

(60) Provisional application No. 62/173,135, filed on Jun. 9, 2015.

(51) Int. Cl.
  *G01S 13/93*   (2006.01)
  *B62J 27/00*   (2006.01)
  (Continued)

(52) U.S. Cl.
  CPC ............. *G01S 13/931* (2013.01); *B62J 27/00* (2013.01); *G01S 7/04* (2013.01); *B62J 2099/002* (2013.01);
  (Continued)

(58) Field of Classification Search
  CPC .......... B62J 2099/0013; B62J 2099/002; B62J 2099/0026; B62J 27/00; G01D 11/245;
  (Continued)

(56) References Cited

U.S. PATENT DOCUMENTS 5,005,661 A    4/1991  Taylor et al. ................. 180/219
5,781,145 A    7/1998  Williams et al. ............... 342/20
(Continued)

OTHER PUBLICATIONS

Printout from https://www.dcrainmaker.com/2014/07/hands-on-backtracker-radar.html ; published prior to Jun. 3, 2016.
(Continued)

*Primary Examiner* — Timothy A Brainard
(74) *Attorney, Agent, or Firm* — Samuel M. Korte; Max M. Ali

(57) ABSTRACT

A radar sensor system implemented using a radar sensor housing and a module electronic device configured to present situational awareness indicators associated with targets determined to be located in proximity to a bicycle. The mobile electronic device includes a position-determining component for determining a current geographic position of the bicycle, a wireless transceiver for receiving radar sensor data from a radar sensor in the radar sensor housing, a display, and a processor coupled with the position-determining component, the wireless transceiver, and the display. The processor is configured to determine one or more situational awareness indicators based on the received radar sensor data and cause the display to present location information and the one or more situational awareness indicators.

11 Claims, 15 Drawing Sheets

(51) Int. Cl.
*G01S 7/04* (2006.01)
*B62J 99/00* (2009.01)

(52) U.S. Cl.
CPC *B62J 2099/0013* (2013.01); *B62J 2099/0026* (2013.01); *G01S 2013/9332* (2013.01)

(58) Field of Classification Search
CPC ... G01S 13/931; G01S 2013/9332; G01S 7/04
USPC .......................................................... 342/146
See application file for complete search history.

(56) References Cited

U.S. PATENT DOCUMENTS

| | | | | |
|---|---|---|---|---|
| 6,731,202 | B1 | 5/2004 | Klaus | 340/425.5 |
| 7,061,372 | B2 * | 6/2006 | Gunderson | G01S 13/931 |
| | | | | 340/435 |
| 7,079,024 | B2 | 7/2006 | Alarcon | 340/539.11 |
| 9,449,518 | B2 * | 9/2016 | Mochizuki | G08G 1/165 |
| 2008/0186382 | A1 * | 8/2008 | Tauchi | G01S 13/89 |
| | | | | 348/148 |
| 2009/0033475 | A1 | 2/2009 | Zuziak et al. | 340/432 |
| 2013/0127638 | A1 * | 5/2013 | Harrison | G08G 1/166 |
| | | | | 340/903 |
| 2014/0225764 | A1 * | 8/2014 | Jarvis | G01S 11/06 |
| | | | | 342/118 |
| 2015/0228066 | A1 * | 8/2015 | Farb | G06K 9/00805 |
| | | | | 348/148 |
| 2016/0090036 | A1 * | 3/2016 | Kiefer | B60Q 1/0023 |
| | | | | 340/435 |
| 2016/0103206 | A1 * | 4/2016 | Pavao-Moreira | G01S 13/08 |
| | | | | 342/104 |

OTHER PUBLICATIONS

Printout from https://www.dcrainmaker.com/2015/10/cyclig-fly6-review.html ; published prior to Jun. 3, 2016.
Printout from https://www.dcrainmaker.com/2015/01/cyclig-mounted-camera.html ; published prior to Jun. 3, 2016.
Printout from http://www.slowtwitch.com/Products/2011_Interbike_Cerevellum_Hindsight_35__2349.html, published prior to Jun. 3, 2016.

* cited by examiner

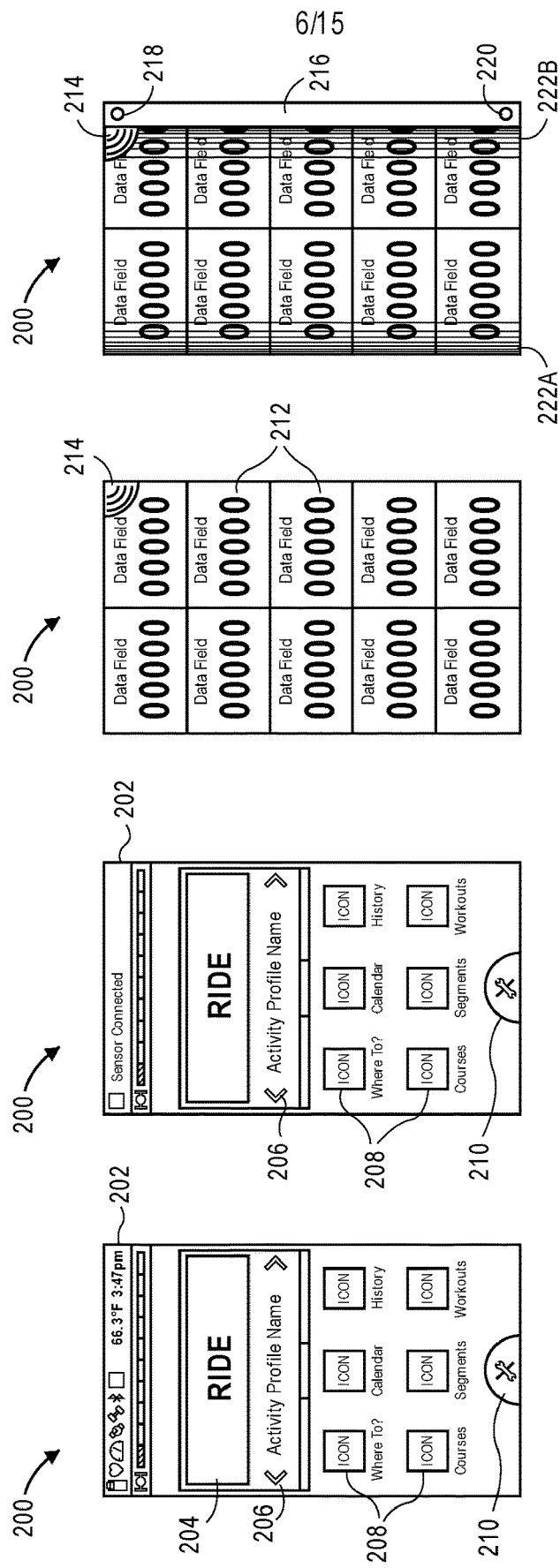

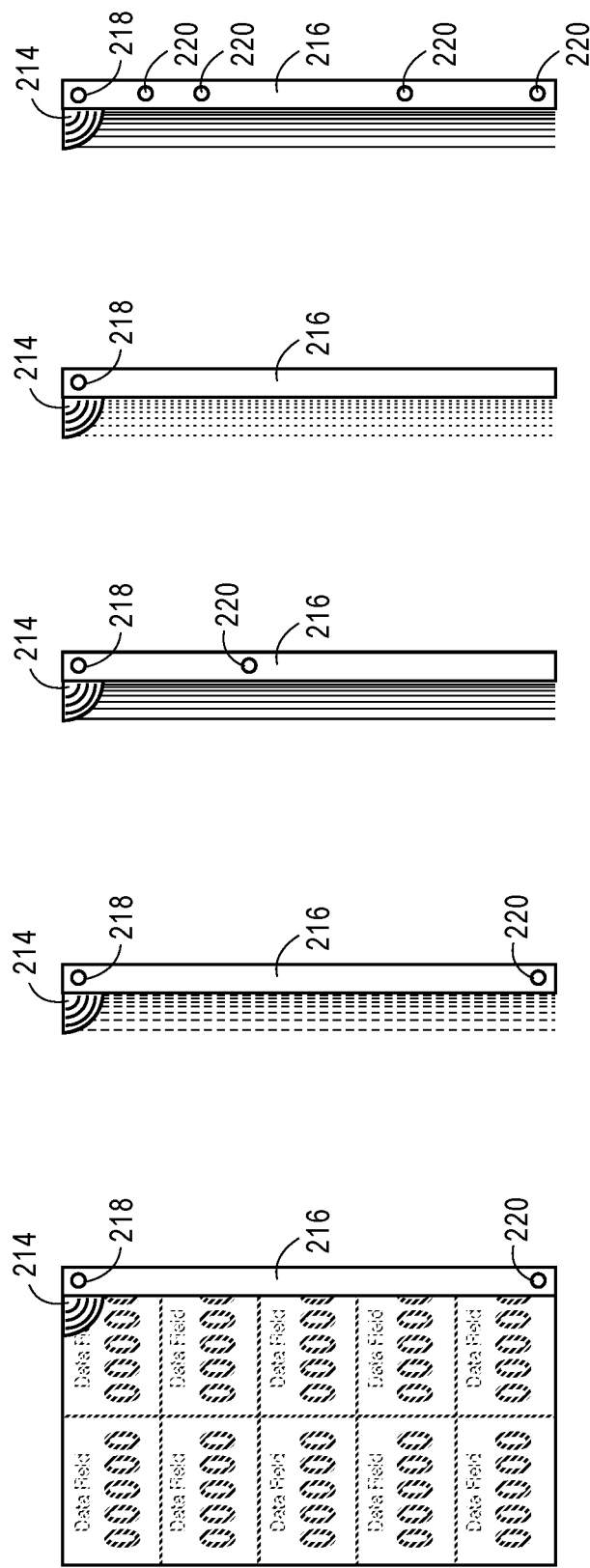

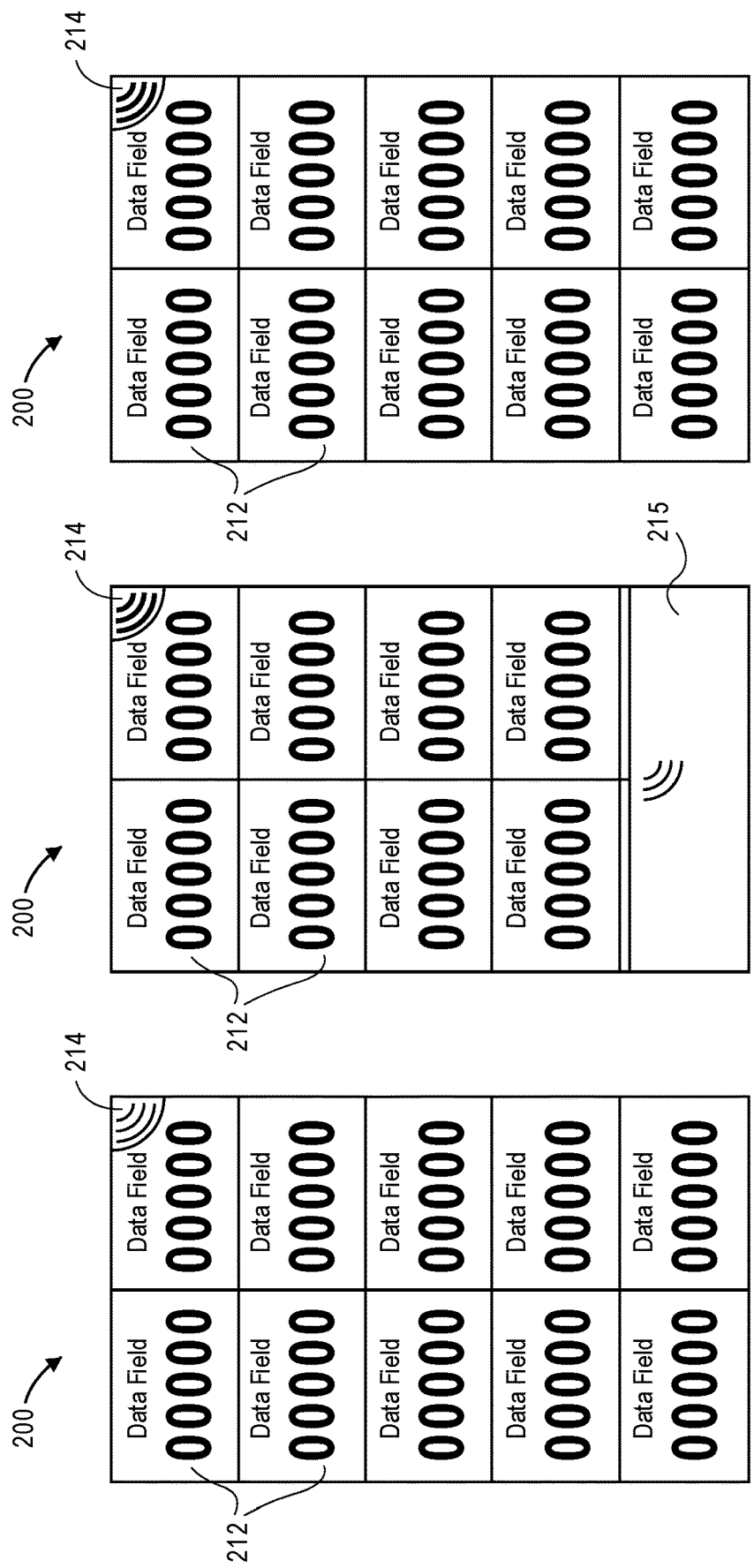

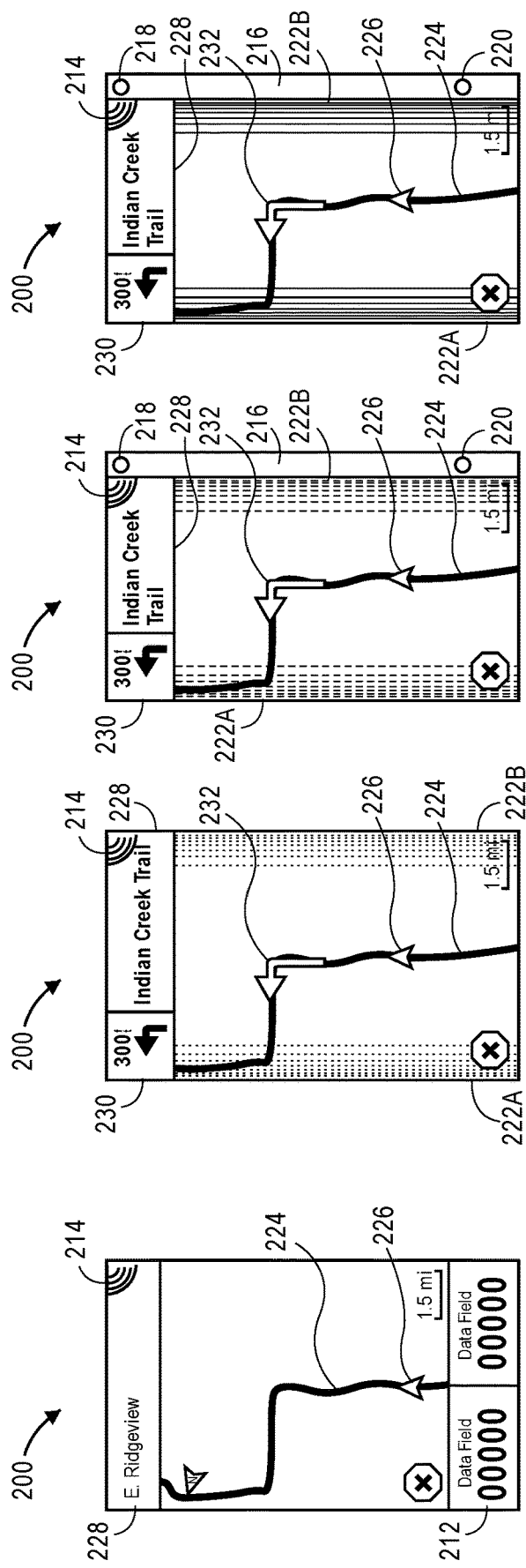

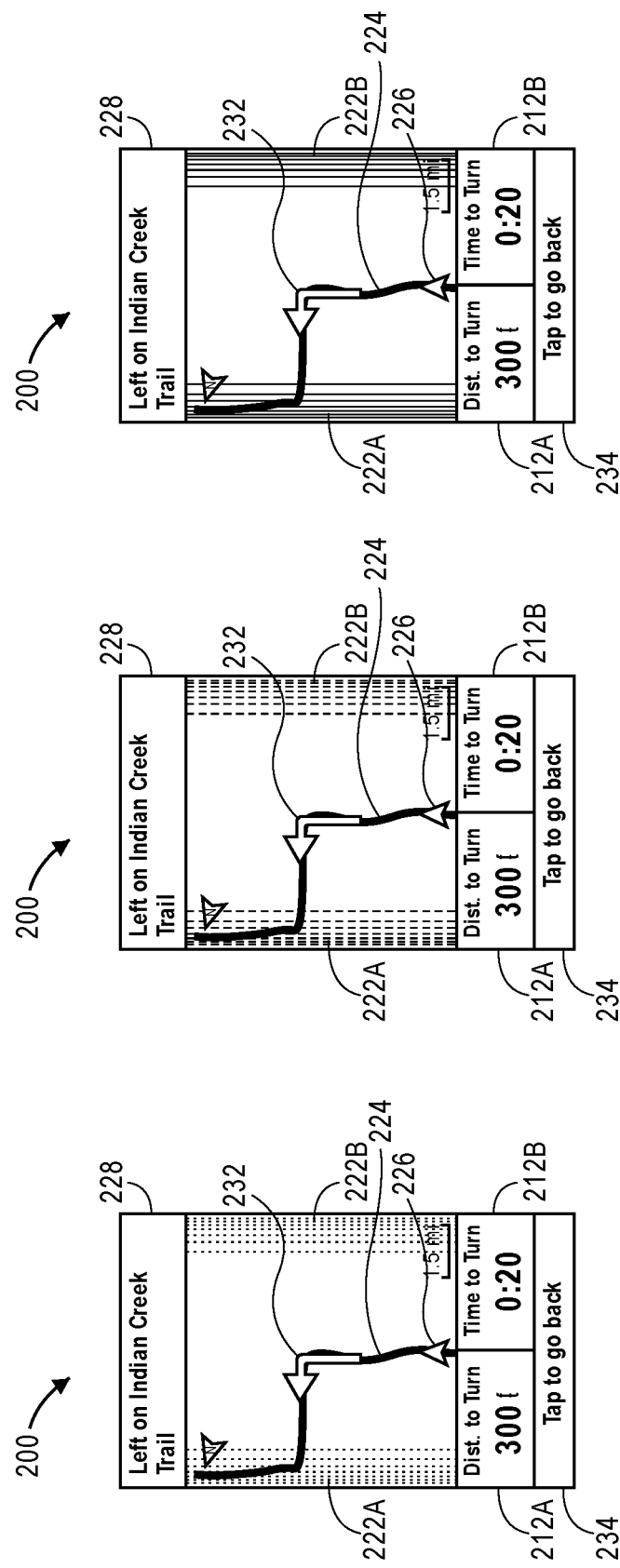

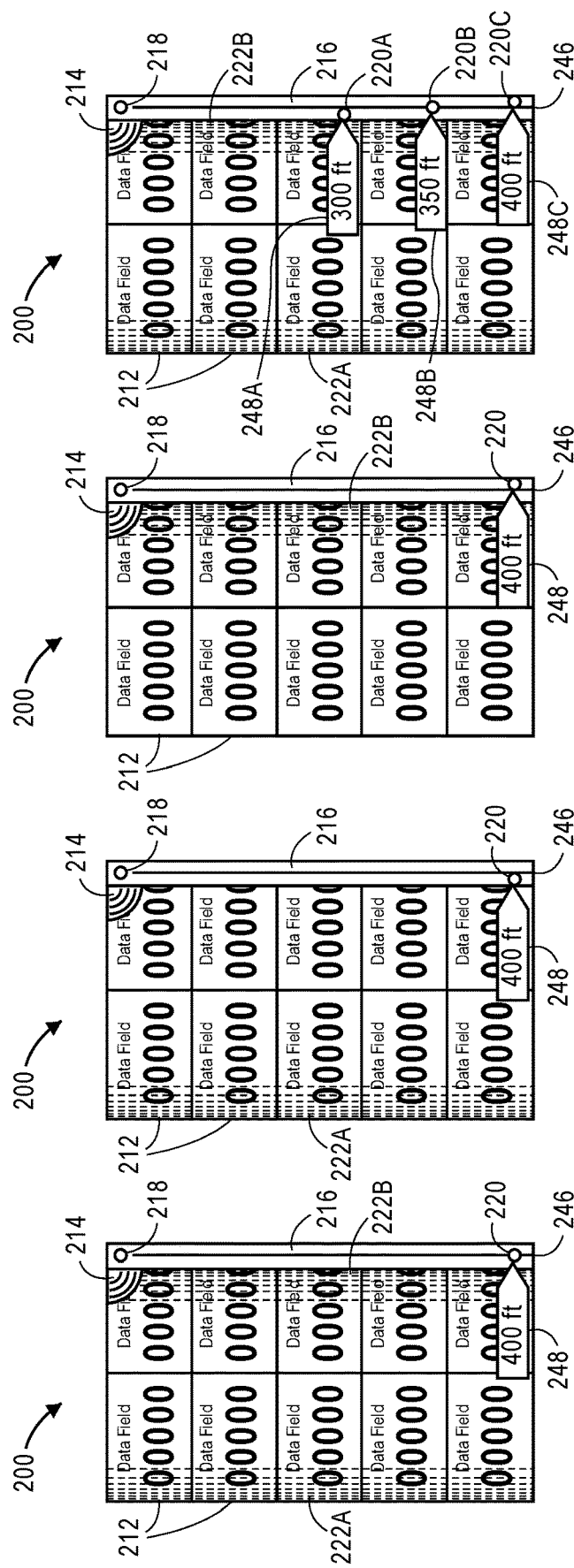

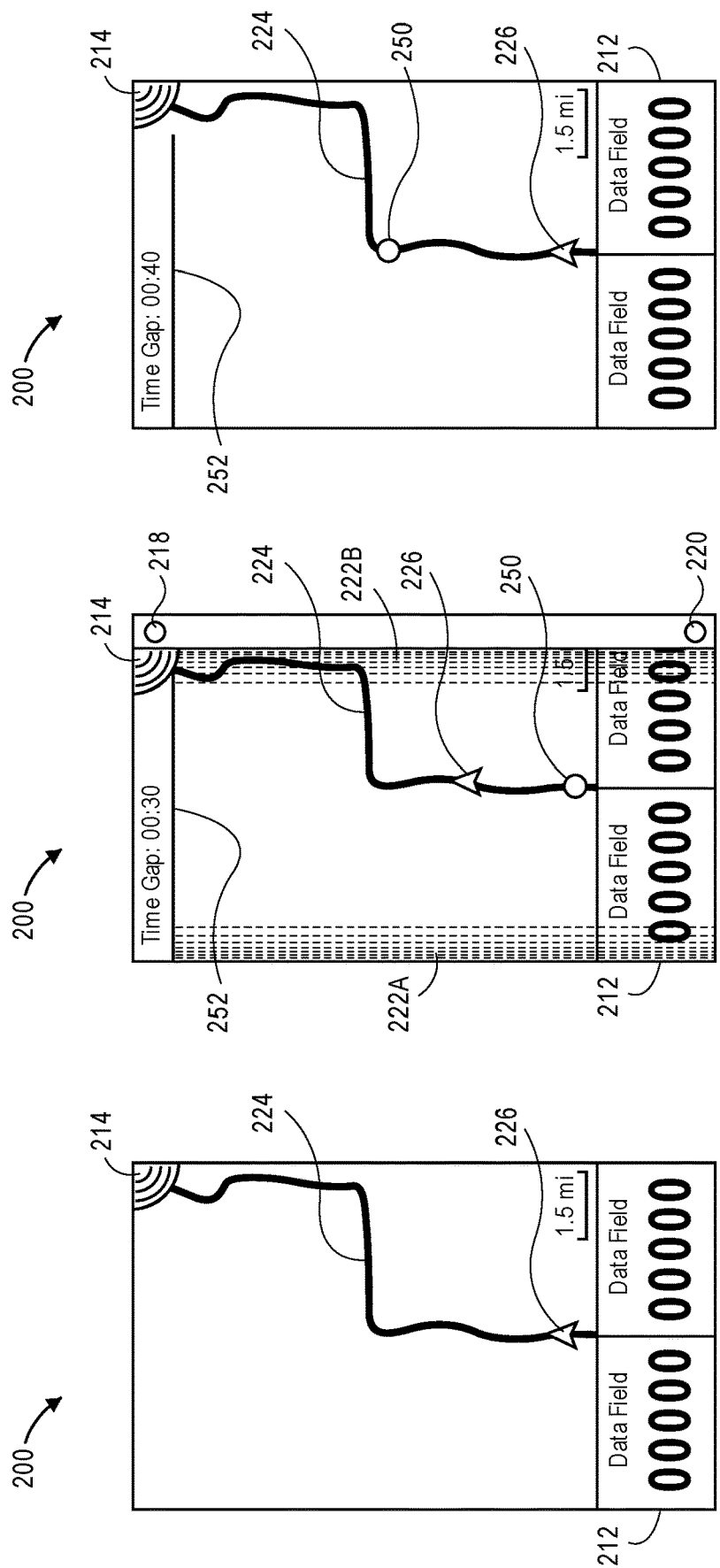

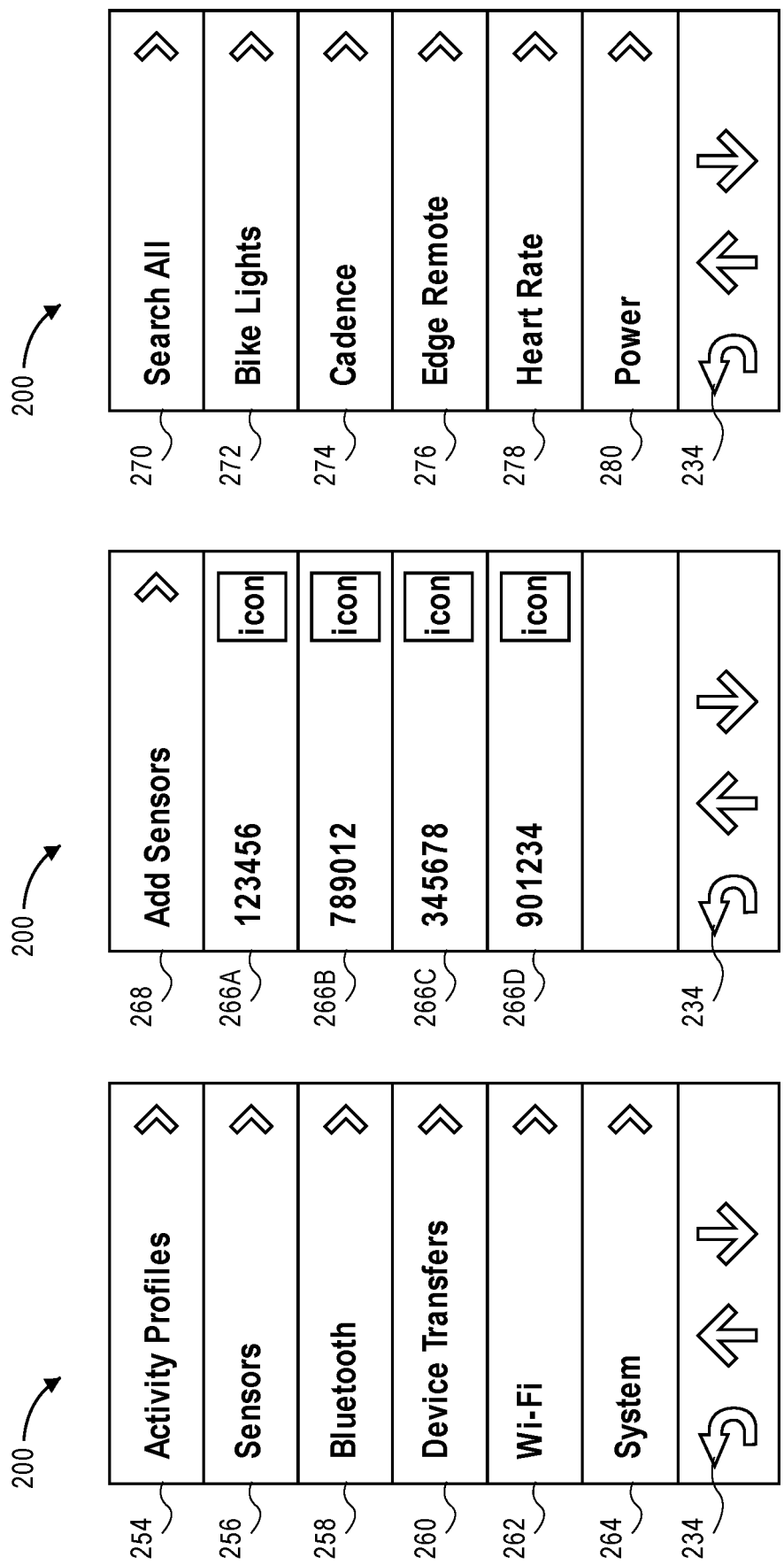

RADAR SENSOR SYSTEM PROVIDING SITUATIONAL AWARENESS INFORMATION

CROSS-REFERENCE TO RELATED APPLICATIONS

The present application claims the benefit under 35 U.S.C. § 119(e) of U.S. Provisional Application Ser. No. 62/173,135, entitled "BICYCLE RADAR SENSOR," which was filed on Jun. 9, 2015. U.S. Provisional Application Ser. No. 62/173,135 is incorporated herein by reference in its entirety.

BACKGROUND

Cyclists often have limited visibility of their surroundings, particularly behind them and beyond turns, and may have little notice or awareness of nearby targets of interest, such as moving vehicles, obstacles, pedestrians, animals, or even other cyclists. Cyclists can use reflectors or lights to alert approaching vehicles of their presence; however, the cyclists, themselves, must typically rely on their natural senses to identify approaching vehicles from behind, upcoming obstacles, and the like.

SUMMARY

The present disclosure is directed to technology that encompasses a radar sensor system having situational awareness indicators. The radar sensor system may include a radar sensor housing having a radar sensor facing an area proximate to (front, behind, left, right, or any combination thereof) the cycle and a mobile electronic device having a processor configured to inform or alert a cyclist about one or more targets, such as moving vehicles, pedestrians, cyclists, and/or other obstacles, determined to be in proximity to his or her cycle (e.g., bicycle, unicycle, tricycle, or other human force-powered vehicle). The radar sensor system provides situational awareness indicators on a display of the mobile electronic device that is viewable by the cyclist while riding the cycle. Additionally, the radar sensor system provides situational awareness indicators in the form of audible and haptic feedback. The mobile electronic device (e.g., a bicycle computer, smart phone, smart watch, head-mounted in-sight display, portable navigation device, or the like) may include a first processor and the radar sensor housing may include a second processor. In embodiments, the display can present situational awareness information based on radar sensor data including measurements made by a radar sensor in a radar sensor housing mounted on a bicycle that is being ridden by a user of the radar sensor system. For example, the measurements may be related to the proximity of or the distance between a detected target (e.g., a nearby vehicle) and the radar sensor and the cyclist.

The situational awareness information presented on the display may include a determined location of a detected target (e.g., an approaching vehicle, pedestrian, cyclist, object, animal, other cyclist, etc.), a determined range of the target to the cyclist, a direction of approach of the target, a determined awareness level of the target, and so forth. For example, a situational awareness indicator may be a tracking bar with an icon illustrative of a target location based on radar sensor data, a dynamic representation of a distance between the target and the bicycle using two icons, a brightness or color of an edge of the display or navigational information (turn arrow) presented on the display, or a numeric time gap between the target and the bicycle based on the radar sensor data. In embodiments, the mobile electronic device can also present location information or positioning data (e.g., geographic coordinates, altitude, map data, navigation information, and so forth) based on a current geographic position received by the first processor from a position-determining component located within the mobile electronic device or the radar sensor housing.

In embodiments, the mobile electronic device may include a position-determining component, such as a global positioning system (GPS) receiver, configured to determine a current geographic position of the bicycle, a transceiver configured to receive radar sensor data from transceiver coupled with a radar sensor of the bicycle, a display, and a processor coupled with the position-determining component, the transceiver, and the display. The processor of the mobile electronic device may be configured to cause the display to determine one or more situational awareness indicators based on the received radar sensor data and cause the display to present location information based on the geographic position determined by the position-determining component and the one or more situational awareness indicators (e.g., an indication of a detected target, a range of the target to the cyclist, a direction of approach of the target, an awareness level, and so forth).

In embodiments, the mobile electronic device may include a haptic feedback element configured to provide one or more vibrations that may be sensed by a user and a speaker configured to provide an audible output. For instance, in embodiments where the mobile electronic device is worn on a wrist of a user, the mobile electronic device may provide situational awareness information to the user using the haptic feedback element and/or the speaker either with or without presenting situational awareness information on a display device of the mobile electronic device.

In embodiments, the radar sensor system includes a radar sensor housing that is mountable to the bicycle and that encloses, wholly or partially, a radar sensor, a processor and a transceiver. The radar sensor housing may be mounted on a cycle in a position such that a portion of the radar sensor faces an area behind the cycle. The mobile electronic device may be mounted to the bicycle or worn by the user (e.g., head-mounted, wrist-worn, etc.) in a position such that its display is viewable by the cyclist. For example, the mobile electronic device may be mountable to or sized to fit within a holder mounted to the user's bicycle, such as the handle bars, or to be mounted to sunglasses worn by the user. Alternatively, in embodiments, the mobile electronic device may be worn on a user's head (e.g., Garmin™ VARIA VISION™ head-mounted in-sight). In some embodiments, the mobile electronic device includes a communication interface that is physically connected (e.g., wired) to a communication interface of the radar sensor housing (or multiple radar sensor housings). The transceiver of the mobile electronic device may comprise a wireless transceiver for communicating wirelessly with the wireless transceiver in the radar sensor housing. In embodiments, the radar sensor may be enclosed entirely or partially within the mobile electronic device.

The technology encompassed by the present disclosure may further comprise a method of informing or alerting a cyclist of targets that may be of interest to the user by providing one or more situational awareness indicators on a display or using a haptic feedback element or speaker of the mobile electronic device. In one or more implementations of the method, a radar sensor may identify at least one target is detected to be present in proximity to a radar sensor and generate radar sensor data that may be wirelessly transmitted (or communicated) to the mobile electronic device. The radar sensor data may be unprocessed measurements of radar reflections (radar beam returns) received by the radar sensor in a sensor field of the radar sensor or information relating to the radar reflections determined by a processor in the radar sensor housing. The processor of the mobile electronic device or the processor of the radar sensor housing may be used to determine information, such as situational awareness indicators, relating to one or more target(s) to aid a user with riding a cycle in areas having stationary and/or moving objects along the user's route from a starting point to a destination.

The radar sensor data may be communicated (transmitted) to a mobile electronic device having a display that is viewable by the cyclist. For example, the radar sensor data may be transmitted to the mobile electronic device via a physical communication link (e.g., a wire) or a wireless communication link (e.g., via a wireless transceiver). The first processor within the mobile electronic device may receive the radar sensor data and determine one or more situational awareness indicators that are presented to the cyclist to inform or alert the cyclist of the detected target and an awareness level associated with the identified target. For example, situational awareness indicators (e.g., text, symbols, icons, highlighting, flashing colors, dimmed or brightened portions of a displayed screen or navigational information (turn arrow) presented on the display, and so forth) are provided via a user interface of the mobile electronic device, which may include the display. The display may provide a situational awareness indicator to inform the user of the presence of a one or more targets within a detectable range of the radar sensor (and thus the cyclist) and an awareness level associated with the detected targets. In this manner, the cyclist can ride the cycle using information relating to the detected target, which may be in front of the cyclist, behind the cyclist, or to the left or right side of the cyclist. In some implementations, the situational awareness indicators may be paired with other information (e.g., guidance, positioning, or location information).

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIGS. 4A through 4I are a diagrammatic views illustrating an example screen display of the mobile electronic device of FIG. 1.

FIGS. 5A through 5C are a diagrammatic views illustrating an example screen display of the mobile electronic device of FIG. 1.

FIGS. 6A through 6G are a diagrammatic views illustrating an example screen display of the mobile electronic device of FIG. 1.

FIGS. 9A through 9D are a diagrammatic views illustrating an example screen display of the mobile electronic device of FIG. 1.

FIGS. 10A through 10C are a diagrammatic views illustrating an example screen display of the mobile electronic device of FIG. 1.

FIGS. 11A through 11C are a diagrammatic views illustrating an example screen display of the mobile electronic device of FIG. 1.

Figure 1:
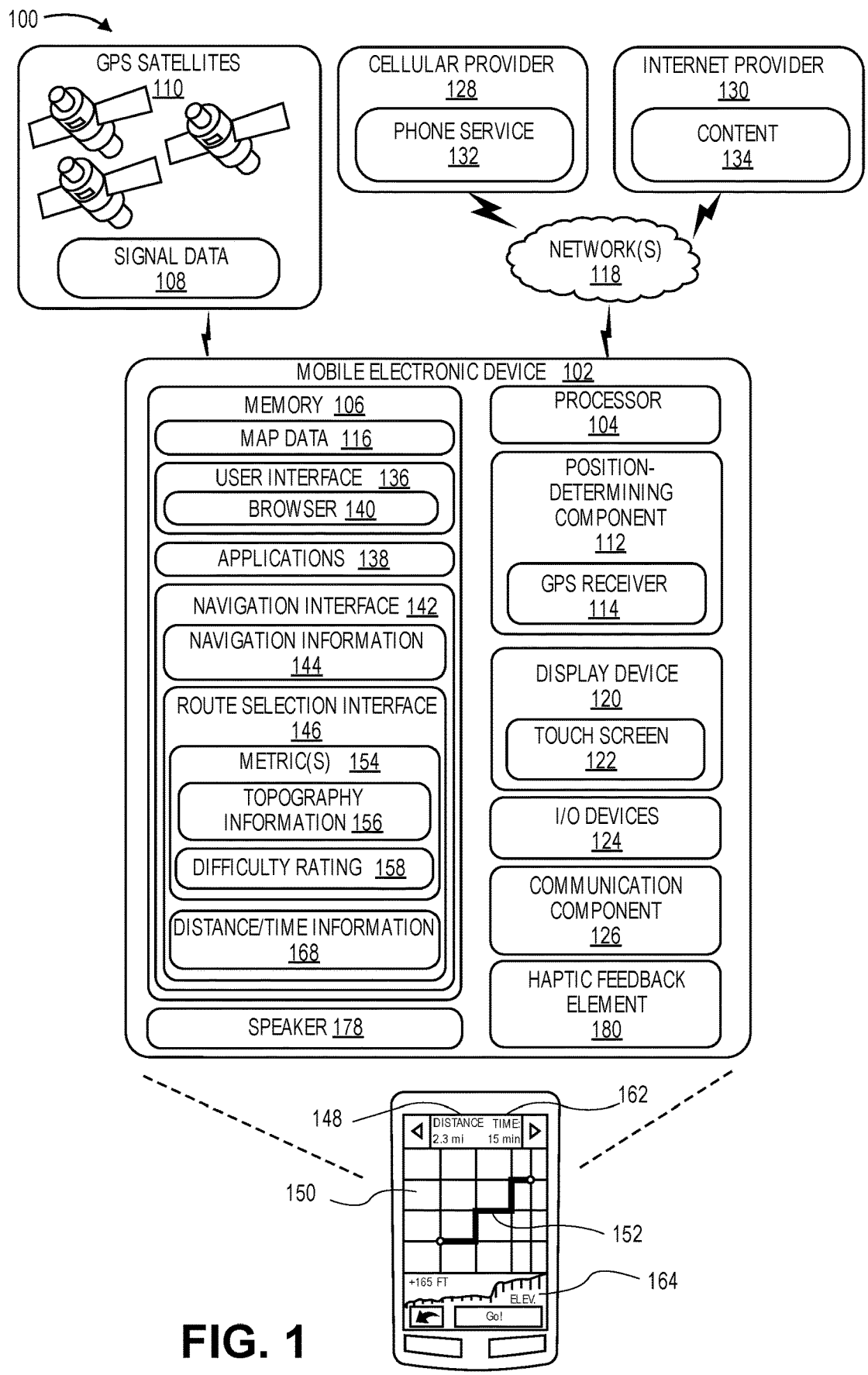
FIG. 1 is a block diagram illustrating an example mobile electronic device environment including a mobile electronic device that can implement a radar sensor system in accordance with embodiments of the technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

Overview

A radar sensor system can inform or alert a cyclist about targets, obstacles, and other objects in proximity to his or her bicycle. For clarity, while the term "bicycle" is used throughout the description for consistency and simplicity, the present invention should not be construed to be limited to use with a bicycle. Embodiments could include a bicycle, unicycle, tricycle, or any other human force-powered vehicle. A cyclist who is assisted by a bike computer, having a geographic positioning system (GPS) receiver and a processor configured to provide turn-by-turn navigation, may be occasionally recommended to perform a turn or lane change. In these scenarios, awareness of nearby moving vehicles and bicycles may be helpful for the cyclist to identify an appropriate moment to perform the turn or lane change. In embodiments, situational awareness indicators may be presented on a display viewable by the cyclist or the situation awareness information may be provided using a haptic feedback element or a speaker of the mobile electronic device. For example, a mobile electronic device that is mounted on the handle bars of the bicycle may include a display viewable by the cyclist that can present situational awareness information (e.g., an indication of determined location(s) of a target(s), the range of the target to the cyclist, the direction of approach of the target, the awareness level of the target, and so forth) based on radar sensor data, including target data corresponding to targets proximate to the bicycle, received from a transceiver of radar sensor housing mounted to the bicycle. In embodiments, the mobile electronic device may be worn on a user's head or mounted to sunglasses worn by the user. A measurement related to radar reflections from a target (e.g., nearby vehicle) proximate to the cyclist may be provided to a user. The display of the mobile electronic device may also present location information (e.g., geographic coordinates, altitude, and so forth) of the bicycle based on the current geographic position of the bicycle communicated to the processor from a position-determining component.

The mobile electronic device may also provide situational awareness information via audible alerts provided by a speaker. For example, the speaker may output a unique tone when at least one target is detected by the processor or output a tone for every new target detected. In embodiments, the processor may control the speaker to adjust a volume or pattern of output tones based on a determined awareness level of one or more targets. The processor may control the speaker to adjust a pattern of tones output by the speaker based on a determined direction of approach of the target. In embodiments, the speaker may include two speakers operating in stereo. The processor may control the two stereo speakers to adjust tone volume or duration to provide feedback relating to a determined direction of approach of one or more targets identified by the radar sensor or processor. The processor may control the speaker to output one or more pre-recorded messages, such as "On your right" or "On your left," to provide a cyclist situational awareness of targets determined to be in proximity of the rider and his bicycle.

The mobile electronic device may also provide situational awareness information using haptic feedback. The mobile electronic device may include a motor and a vibrating element that may be controlled by a processor to produce vibrations of constant or varying intensity. For instance, a processor may control the haptic feedback element to produce a vibration when at least one target is determined to exist in a sensor field of a radar sensor (e.g., behind the cyclist) or when a new target is identified in a sensor field of a radar sensor. In embodiments, a processor may control the haptic feedback element to adjust vibration intensity (strength) or a pattern of the vibrations based on a determined awareness level of a target or a determined direction of approach of the target.

The radar sensor system may include a radar sensor housing having a radar sensor facing an area proximate to (front, behind, left, right, or any combination thereof) the cycle. The radar sensor can detect one or more targets (e.g., vehicles, objects, pedestrians, animals, and so forth) in range of the bicycle based on reflections (radar beam returns) received by the radar sensor from the targets within a sensor field of the radar sensor. The radar sensor housing may be mounted on the user's bicycle such that the radar sensor may face any area proximate to, such as an area to the front of, behind, left side, right side, or any combination thereof, the bicycle. Radar sensor data may include including target data corresponding to targets proximate to the bicycle. The radar sensor data may be generated by the radar sensor or the processor of the radar sensor housing. For instance, the radar sensor data may be unprocessed radar reflections (radar beam returns) received by the radar sensor in a sensor field of the radar sensor or information relating to the radar reflections determined by a processor in the radar sensor housing.

The processor of the mobile electronic device (first processor of the radar sensor system) or the processor of the radar sensor housing (second processor of the radar sensor system) may be used to determine information, such as situational awareness indicators, relating to one or more target(s) to aid a user with riding a cycle in areas having stationary and/or moving objects along the user's route from a starting point to a destination. The first processor of the radar sensor system in the mobile electronic device may receive the detected current geographic position and radar sensor data from the position-determining component and a transceiver of the radar sensor housing, respectively, and may be configured to determine one or more situational awareness indicators based on the received radar sensor data, including target data corresponding to targets proximate to the bicycle, and cause the display to provide the location information (e.g., location or geographical position, altitude, or navigation data in text, symbols, a graphical (e.g., map) representation, or the like) and a situational awareness indicator. The situational awareness indicator may be a tracking bar with an icon illustrative of a target location based on radar sensor data, a dynamic representation of a distance between the target and the bicycle using two icons, a brightness or color of an edge of the display or navigational information (turn arrow) presented on the display, or a numeric time gap between the target and the bicycle based on the radar sensor data including target data corresponding to targets proximate to the bicycle. The situational awareness indicator may include text, symbols, or an iconic or graphical representation located on or adjacent to a map, textual, or symbolic representation of location or positioning data, or any combination thereof. For example, the first processor of the radar sensor system in the mobile electronic device can cause the display to provide a map with an icon associated with the detected target on the map or present a tracking bar next to the map with an iconic representation of the detected target relative to the user's bicycle. The first processor of the radar sensor system in the mobile electronic device can also cause the display to show text, symbols, icons, highlighting, flashing colors, dimmed or brightened portions of a displayed screen, and so forth to indicate an awareness level (e.g., "low awareness level," "moderate awareness level," or "high awareness level") associated with the detected target.

In implementations, the first processor of the radar sensor system in the mobile electronic device is configured to cause the display to provide a first indicator when a detected target is determined to be in proximity (front, behind, left side, right side, or any combination thereof) to the bicycle. For example, the first processor of the radar sensor system in the mobile electronic device may be configured to cause the display to provide a tracking bar when a target is determined to be present within detectable range of the radar sensor or is detected to be present within threshold proximity of the radar sensor housing (and thus the bicycle) based on the radar sensor data including target data. The first processor of the radar sensor system in the mobile electronic device may also be configured to cause the display to provide an icon illustrative of the target detected to be proximate to the radar sensor housing on the tracking bar, when the target is determined to be present within a threshold distance from the bicycle based on the radar sensor data including target data corresponding to targets proximate to the bicycle. In some implementations, the first processor of the radar sensor system in the mobile electronic device may be further configured to cause the display to provide a dynamic representation of a distance determined by the processor between the bicycle and a target determined to be present proximate to the bicycle based on the received radar sensor data using an icon illustrative of the target and a second icon illustrative of the bicycle. The separation between the icons is representative of the distance between the bicycle and a target based on the radar sensor data including target data corresponding to targets proximate to the bicycle. For example, the first processor of the radar sensor system in the mobile electronic device may be configured to cause the display to show a substantially instantaneous or periodically updated representation of the tracking bar, where the cyclist icon and the target icon are presented closer to one another, or further away from one another, based on changes in the distance between the cyclist and the target.

In another example, the situational awareness indicator determined by first processor of the radar sensor system in the mobile electronic device is a brightness or color of at least one portion of one or more edges of a display (including a display screen) to indicate an awareness level determined in association with a target determined to be present in proximity to the bicycle. The first processor may be configured to cause a change in the brightness or color of an edge of a display device or navigational information (turn arrow) presented on the display to indicate the presence of a target proximate to the bicycle in a sensor field of a radar sensor. For example, the first processor of the radar sensor system can cause at least one edge of the display or navigational information (turn arrow) to change color (e.g., change to red, yellow, or green) to indicate an awareness level (i.e., a suggested level of awareness of the cyclist's surroundings that the cyclist may wish to employ) associated with a target determined to be present (detected) proximate to the bicycle based on radar sensor data, including target data corresponding to targets proximate to the bicycle, provided by a transceiver of the radar sensor housing.

The awareness level associated with a target may be determined based on one or more factors such as, but not limited to, a determined distance between the cyclist and detected target, a determined approaching speed of the target or relative speeds of the cyclist and target, a determined rate of acceleration or deceleration of an approaching target, a determined change of direction (e.g., turn, lane change, etc.) of an approaching target, a number of targets, a determined size of the target, map or route information (e.g., predicted visibility due to turns, hills, trees, and other geographic features, weather information, and so forth), any combination of the foregoing, and so on, based on the radar sensor data including target data corresponding to targets proximate to the bicycle. In some implementations, the first processor of the radar sensor system in the mobile electronic device may also be configured to cause a change in brightness or color of the at least one portion of the edge of the screen of the display or navigational information (turn arrow) presented on the display in response to determining a target in a first direction associated with the edge corresponding the determined direction of the target relative to location and/or orientation of the mobile electronic device display. The first processor of the radar sensor system in the mobile electronic device may also be configured to cause a change in brightness or color of at least a portion of a second edge of the display in response to determining that a target is present in a second direction associated with the second edge based on the radar sensor data including target data corresponding to targets proximate to the bicycle. For example, the processor may be configured to cause the right edge of the mobile electronic device display or navigational information (turn arrow) presented on the device display to change color or brightness to indicate an approaching vehicle or other target determined to be present (detected) in a right sensor field of the radar sensor and the left edge of the display to change color or brightness to indicate an approaching vehicle or other target determined to be present (detected) in a left sensor field of the radar sensor.

The processor can also be configured to cause a change in brightness or color of at least a portion of multiple edges of the display or navigational information (turn arrow) presented on the display in response to determining that a target is present in a third direction associated with the associated combination of edges corresponding the determined direction of the target relative to location and/or orientation of the mobile electronic device display. For example, the processor may be configured to cause the left and right edges of the display or navigational information (turn arrow) presented on the display to change color and/or brightness to indicate an approaching vehicle or other target, the position of which is determined based on radar sensor data, located in a rear (or any other) sensor field of the radar sensor. The color and/or brightness change may be greater (increased) if a target determined to be located in the sensor field of the radar sensor is determined to be traveling faster than (approaching) the bicycle on which the radar sensor housing and mobile electronic device are mounted than targets determined to be located in the sensor field that are determined to be traveling at the same or less speed than the bicycle. Similarly, in embodiments where the audible or haptic feedback is provided to communicate situational awareness information, the change in volume of the audible output and/or the intensity of the haptic feedback (vibration) may be greater (increased) if a target determined to be located in the sensor field of the radar sensor is determined to be traveling faster than (approaching) the bicycle on which the radar sensor housing and mobile electronic device are mounted than targets determined to be located in the sensor field that are determined to be traveling at the same or less speed than the bicycle. For example, the display color or brightness, speaker volume or haptic feedback may be changed to the highest (e.g., brightest, loudest, most intense or strongest) configuration of the display, speaker, or haptic feedback element, if a target determined to be located in the sensor field of the radar sensor is determined to be quickly approaching the radar sensor housing and the bicycle at a rate of at least three times the current speed of the bicycle, which is determined by the first processor or the second processor based on information provided by a position-determining component. In such a manner, the user may be informed of relevant targets (objects) proximate to the user and take precautionary or corrective measures, if necessary.

Situational awareness indicators may also include metrics associated with one or more targets determined to be present (detected) in the sensor field of the radar sensor. For example, the first processor of the radar sensor system in the mobile electronic device may be configured to determine a time gap associated with a determined distance between the bicycle to which the radar sensor housing is mounted and a moving or stationary target detected in proximity to the bicycle and cause the display to present the determined time gap. In embodiments where the audible or haptic feedback is provided to communicate situational awareness information, a speaker of the mobile electronic device, or a speaker in wireless communication with the mobile electronic device, may output a message indicating the presence of a target proximate to the cyclist and a determined estimate of time until an approaching target will reach the cyclist. The mobile electronic device may identify a target approaching the radar sensor housing (and the cyclist), and determine the time required for the target to reach the radar sensor housing based on the current velocity of the target and the cyclist's bicycle. For instance, the processor may cause an audible signal such as, "vehicle identified fifty (50) feet behind, will reach bicycle in thirty (30) second."

In implementations, the first processor or the second processor may use the radar sensor data including target data corresponding to targets to determine the time gap based on the distance between the bicycle and the detected target and relative speeds of the bicycle and the detected target. The first processor or the second processor may determine current locations of the bicycle and target(s) determined to be located in the sensor field based on inputs such as, but not limited to, location information (e.g., location or positioning data measured by the position-determining component), communicated information (e.g., a communication received from the detected target), bicycle speed measurements (e.g., from a bicycle speedometer), and so forth.

The radar sensor housing, including at least one radar sensor, is mountable to a bicycle being ridden by the user and the mobile electronic device is also mountable to the same bicycle in a position in which its display is viewable by the cyclist, to the user's wrist, or to an accessory (e.g., sunglasses) worn by the user on his head. In embodiments where the situational awareness information is presented on a display device of the mobile electronic device, it is to be understood that the mobile electronic device may be mounted anywhere as long as its display device may be seen by the user while riding the bicycle. For example, the mobile electronic device may be mountable to or sized to fit within a holder mounted to a steering assembly (e.g., handle bars) of the bicycle. In embodiments where the situational awareness information is provided using a speaker or a haptic feedback element, the mobile electronic device may not include a display or a display of the mobile electronic device does not need to be mounted in a location where it may be seen by the user while riding the bicycle. In embodiments, the mobile electronic device may be coupled with or in communication with (wired or wirelessly) headphones or a mobile device in communication with headphones such that audible information may be output to the user by the headphones. For instance, the mobile electronic device may determine situational awareness information for one or more targets determined to be in proximity to the bicycle and then cause the headphones to output audible alert tones or messages (e.g., "vehicle approaching to your right").

In some embodiments, the mobile electronic device is physically connected (e.g., wired) to one or more radar sensor housings mounted on the bicycle such that one or more radar sensors may have a sensor field in front of, behind, to the left side, and/or to the right side of the bicycle. In embodiments, the mobile electronic device may include or integrate a radar sensor. In other embodiments, a transceiver of the mobile electronic device may be configured for wireless communication with a transceiver of the radar sensor housing.

FIG. 1 illustrates an exemplary mobile electronic device environment 100 that is operable to perform the techniques discussed herein. The environment 100 includes a mobile electronic device 102 (e.g., a bicycle computer like the GARMIN™ EDGE™ bicycle computer, GARMIN™ VARIA VISION™ head-mounted in-sight display, GARMIN™ VIRB™ action camera, smart phone, smart watch, etc.) operable to provide navigation functionality to the user of the mobile electronic device 102. The mobile electronic device 102 may be configured in a variety of ways. For example, a mobile electronic device 102 may be configured for use during fitness and/or sporting activities, such a recreational and competitive bike riding. However, the mobile electronic device 102 can also comprise a sport watch, a golf computer, a smart phone providing fitness or sporting applications (apps), a hand-held GPS device, and so forth. It is contemplated that the techniques may be implemented in any mobile electronic device that includes navigation functionality. Thus, the mobile electronic device 102 may also be configured as a portable navigation device (PND), a mobile phone, a hand-held portable computer, a tablet, a personal digital assistant, a multimedia device, a media player, a gaming device, combinations thereof, and so forth. In the following description, a referenced component, such as mobile electronic device 102, may refer to one or more devices, and therefore by convention reference may be made to a single device (e.g., the mobile electronic device 102) or multiple device (e.g., the mobile electronic devices 102, the plurality of mobile electronic devices 102, and so on) using the same reference number.

In FIG. 1, the mobile electronic device 102 is illustrated as including a first processor 104 and a memory 106. The first processor 102 may perform the functions described herein independent of a second processor in a radar sensor housing of the radar sensor system or in conjunction with the second processor by using wired or wireless communication to communicate information between the processors of the radar sensor system. The first processor 104 provides processing functionality for the mobile electronic device 102 and may include any number of processors, micro-controllers, or other processors, and resident or external memory for storing data and other information accessed or generated by the mobile electronic device 102. The first processor 104 and second processor may execute one or more software programs or computer-readable instructions that implement the operations described herein. The first processor 104 and second processor are not limited by the materials from which it is formed or the processing mechanisms employed therein and, as such, may be implemented via semiconductor(s) and/or transistors (e.g., electronic integrated circuits (ICs)), and so forth.

The memory 106 is an example of device-readable storage media that provides storage functionality to store various data associated with the operation of the mobile electronic device 102, such as the software program and code segments mentioned above, or other data to instruct the first processor 104 and other elements of the mobile electronic device 102 to perform the techniques described herein. Although a single memory 106 is shown, a wide variety of types and combinations of memory may be employed. The memory 106 may be integral with the first processor 104, stand-alone memory, or a combination of both. The memory 106 may include, for example, removable and non-removable memory elements such as random access memory (RAM), read-only memory (ROM), Flash (e.g., secure digital (SD) card, mini-SD card, micro-SD card), solid-state disk (SSD), magnetic, optical, universal serial bus (USB) memory devices, and so forth.

The mobile electronic device 102 is further illustrated as including functionality to determine position. For example, the mobile electronic device 102 may receive signal data 108 transmitted by one or more position data platforms and/or position data transmitters, examples of which are depicted as Global Positioning System (GPS) satellites 110. More particularly, the mobile electronic device 102 may include a position-determining component 112 that may manage and process signal data 108 received from GPS satellites 110 via a GPS receiver 114. The position-determining component 112 is representative of functionality operable to determine a geographic position through processing of the received signal data 108. The signal data 108 may include various data suitable for use in position determination, such as timing signals, ranging signals, ephemerides, almanacs, and so forth.

Position-determining component 112 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, the position-determining component 112 may be configured in a variety of ways to perform a wide variety of functions. For example, the position-determining component 112 may be configured for bicycle navigation (e.g., implemented within a bicycle computer); however, the position-determining component 112 may also be configured for other vehicle navigation or tracking.

The position-determining component 112, for example, can use signal data 108 received via the GPS receiver 114 in combination with map data 116 that is stored in the memory 106 to generate navigation instructions (e.g., turn-by-turn instructions to an input destination or POI), show a current position on a map, and so on. Position-determining component 112 may include one or more antennas to receive signal data 108 as well as to perform other communications, such as communication via one or more networks 118 described in more detail below. The position-determining component 112 may also provide other position-determining functionality, such as to determine an average speed, calculate an arrival time, and so on.

Although a GPS system is described and illustrated in relation to FIG. 1, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

The mobile electronic device 102 may include a display device 120 to display information to a user of the mobile electronic device 102. In embodiments, the display device 120 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display device 120 may be backlit via a backlight such that it may be viewed in the dark or other low-light environments.

The display device 120 may be provided with a touch screen 122 to receive input (e.g., data, commands, etc.) from a user. For example, a user may operate the mobile electronic device 102 by touching the touch screen 122 and/or by performing gestures on the touch screen 122. In some embodiments, the touch screen 122 may be a capacitive touch screen, a resistive touch screen, an infrared touch screen, combinations thereof, and the like. The mobile electronic device 102 may further include one or more input/output (I/O) devices 124 (e.g., a keypad, buttons, a wireless input device, a thumbwheel input device, a trackstick input device, and so on). The I/O devices 124 may include one or more audio I/O devices, such as a microphone, speakers, and so on.

The mobile electronic device 102 may also include a communication component 126 representative of communication functionality to permit mobile electronic device 102 to send/receive data between different devices (e.g., components/peripherals) and/or over the one or more networks 118. Communication component 126 may be a transceiver coupled with the first processor 104. Communication component 126 may be representative of a variety of communication components and functionality including, but not limited to: one or more antennas; a browser; a transmitter and/or receiver; transceiver, a wireless radio; data ports; software interfaces and drivers; networking interfaces; data processing components; and so forth.

The one or more networks 118 are representative of a variety of different communication pathways and network connections which may be employed, individually or in combinations, to communicate among the components of the environment 100. In embodiments, networks 118 may include wireless communication between communication component 126 (transceiver) and a transceiver within the radar sensor housing. Thus, the one or more networks 118 may be representative of communication pathways achieved using a single network or multiple networks. Further, the one or more networks 118 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to, networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on. Wired communications are also contemplated such as through universal serial bus (USB), Ethernet, serial connections, and so forth.

The mobile electronic device 102, through functionality represented by the communication component 126, may be configured to communicate via one or more networks 118 with a cellular provider 128 and an Internet provider 130 to receive mobile phone service 132 and various content 134, respectively. Content 134 may represent a variety of different content, examples of which include, but are not limited to: information relating to high-risk geographic areas (e.g., intersections, streets, etc.), map data, which may include route information; web pages; services; music; photographs; video; email service; instant messaging; device drivers; real-time and/or historical weather data; instruction updates; and so forth.

The mobile electronic device 102 is illustrated as including a user interface 136, which is storable in memory 106 and executable by the first processor 104. The user interface 136 is representative of functionality to control the display of information and data to the user of the mobile electronic device 102 via the display device 120. In some implementations, the display device 120 may not be integrated into the mobile electronic device and may instead be connected externally using universal serial bus (USB), Ethernet, serial connections, and so forth. The user interface 136 may provide functionality to allow the user to interact with one or more applications 138 of the mobile electronic device 102 by providing inputs via the touch screen 122 and/or the I/O devices 124. For example, the user interface 136 may cause an application programming interface (API) to be generated to expose functionality to an application 138 to configure the application for display by the display device 120 or in combination with another display. In embodiments, the API may further expose functionality to configure the application 138 to allow the user to interact with an application 138 by providing inputs via the touch screen 122 and/or the I/O devices 124.

Applications 138 may comprise software, which is storable in memory 106 and executable by the first processor 104, to perform a specific operation or group of operations to furnish functionality to the mobile electronic device 102. Example applications 138 may include bike riding applications, navigation/guidance applications, fitness applications, exercise applications, health applications, diet applications, cellular telephone applications, instant messaging applications, email applications, photograph sharing applications, calendar applications, address book applications, and so forth.

In implementations, the user interface 136 may include a browser 140. The browser 140 may enable the mobile electronic device 102 to display and interact with content 134 such as a webpage within the World Wide Web, a webpage provided by a web server in a private network, and so forth. The browser 140 may be configured in a variety of ways. For example, the browser 140 may be configured as an application 138 accessed by the user interface 136. The browser 140 may be a web browser suitable for use by a full resource device with substantial memory and processor resources (e.g., a smart phone, a personal digital assistant (PDA), etc.). However, in one or more implementations, the browser 140 may be a mobile browser suitable for use by a low-resource device with limited memory and/or processing resources (e.g., a mobile telephone, a portable music device, a transportable entertainment device, etc.). Such mobile browsers typically conserve less memory and processor resources, but may offer fewer browser functions than web browsers.

The mobile electronic device 102 is illustrated as including a navigation interface 142, which may be implemented by program instructions stored in memory 106 and executable by the first processor 104. The navigation interface 142 represents functionality to access map data 116 that is stored in the memory 106 to provide mapping and navigation functionality to aid the user of the mobile electronic device 102 with traveling from a starting location to a destination. For example, the navigation interface 142 may generate navigation information 144 that includes maps and/or map-related content for display by display device 120. As used herein, map-related content includes information associated with maps generated by the navigation interface 142 and may include route information, POIs, information associated with POIs, map legends, controls for manipulation of a map (e.g., scroll, pan, etc.), street views, aerial/satellite views, and the like, displayed on or as a supplement to one or more maps. Map-related content may be retrieved from map data 116, content 134, other third party sources, or any combination thereof.

In one or more implementations, the navigation interface 142 may be configured to utilize the map data 116 to generate navigation information 144 that includes maps and/or map-related content for display by the mobile electronic device 102 independently of content sources external to the mobile electronic device 102. Thus, for example, the navigation interface 142 may be capable of providing mapping and navigation functionality when access to external content 134 is not available through network 118. It is contemplated, however, that the navigation interface 142 may also be capable of accessing a variety of content 134 via the network 118 to generate navigation information 144 including maps and/or map-related content for display by the mobile electronic device 102 in one or more implementations.

The navigation interface 142 may be configured in a variety of ways. For example, the navigation interface 142 may be configured as an application 138 accessed by the user interface 136. The navigation interface 142 may utilize position data determined by the position-determining component 112 to show a current position of the user (e.g., the mobile electronic device 102) on a displayed map, furnish navigation instructions (e.g., turn-by-turn instructions to an input destination or POI), calculate traveling distance/time information 168 (e.g., distance 148 and time 162 shown in FIG. 1), and so on.

As illustrated in FIG. 1, the navigation interface 142 further includes a route selection interface 146, which is also storable in memory 106 and executable by the first processor 104. The route selection interface 146 causes the display device 120 of the mobile electronic device 102 to be configured to display route selection information. In the implementation shown, the route selection information is illustrated in the format of a map page 150 that includes a route graphic 152 representing a route that may be traversed by a cyclist using the mobile electronic device 102 (e.g., by a bicycle in or on which the mobile electronic device 102 is mounted or carried). The route selection interface 146 can also provide various metrics 154 such as topography information 156, a difficulty rating 158 associated with traversing a geographic area, elevation data 164, and so forth.

The mobile electronic device 102 is further illustrated as including functionality to provide audible and tactile (vibration-based) feedback to a user. In embodiments, the mobile electronic device 102 includes a speaker 178 and a haptic feedback element 180. Speaker 178 may be any sound producing element (e.g., speaker, headset, mono or stereo headphones, etc.). Haptic feedback element 180 may be a vibration-producing component such as a motor coupled to an eccentric load.

The mobile electronic device 102 may include the speaker 178 and haptic feedback element 180 in addition to or in lieu of display device 120. For instance, in embodiments where mobile electronic device 102 may not be mounted or worn in a position in which its display device 120 may be seen by a cyclist while riding a bicycle, speaker 178 may provide audible communication of situational awareness information determined by processor 104 to the cyclist. Similarly, haptic feedback element 180 may provide tactile communication of situational awareness information determined by processor 104 to the cyclist.

Figure 2:
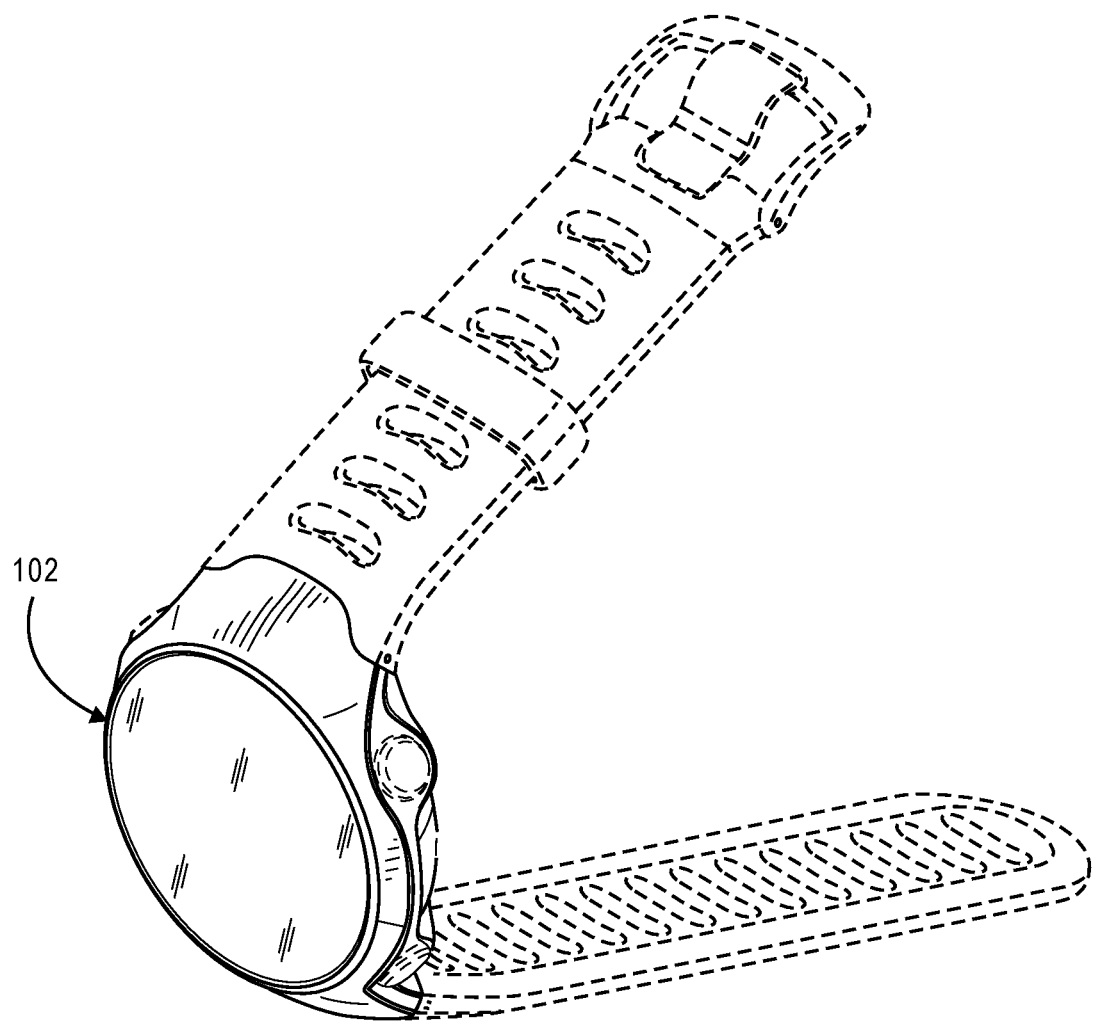
FIG. 2 is a perspective view illustrating an example implementation of the mobile electronic device shown in FIG. 1.

FIG. 2 illustrates an additional example of the mobile electronic device 102, where the mobile electronic device 102 is configured as a watch. In other embodiments, it is contemplated that the mobile electronic device 102 can comprise or may be integrated within or otherwise implemented in any mobile electronic device that includes navigation functionality.

FIGS. 3A through 3D show a radar sensor system 170 for a bicycle (e.g., bicycle 174). Although implementations for bicycle 174 are discussed herein, the bicycle can include, but is not limited to, a tricycle, unicycle, multi-person pedal bike or car, or any other human force-powered vehicle. Accordingly, any reference to "bicycle 174" should be understood as including any type of cycle.

In embodiments, the mobile electronic device 102 and radar sensor housing are operable to implement the features of the radar sensor system 170. For example, the mobile electronic device 102 may include or be configured to wirelessly communicate with one or more radar sensors (e.g., radar sensors 172A and 172B) wholly or partially enclosed within a radar sensor housing mounted on the bicycle 174. For example, the radar sensor housings 172A and 172B, each including a radar sensor with a sensor field in an area proximate to the bicycle, may be mounted to a front, rear, and/or side portion of the bicycle such that the sensor field may be directed in front of the bicycle, behind the bicycle, the right side of the bicycle, the left side of the bicycle, or any combination thereof. In embodiments, the radar sensor system 170 or portions of the radar sensor system 170, such as the mobile electronic device 102, portions of the mobile electronic device 102, or radar sensors 172A and 172B, may be built into another device. The radar sensor housing 172A/172B may be a standalone device having a transceiver enabling the second processor to wirelessly communicate with the mobile electronic device 102.

Figure 3A:
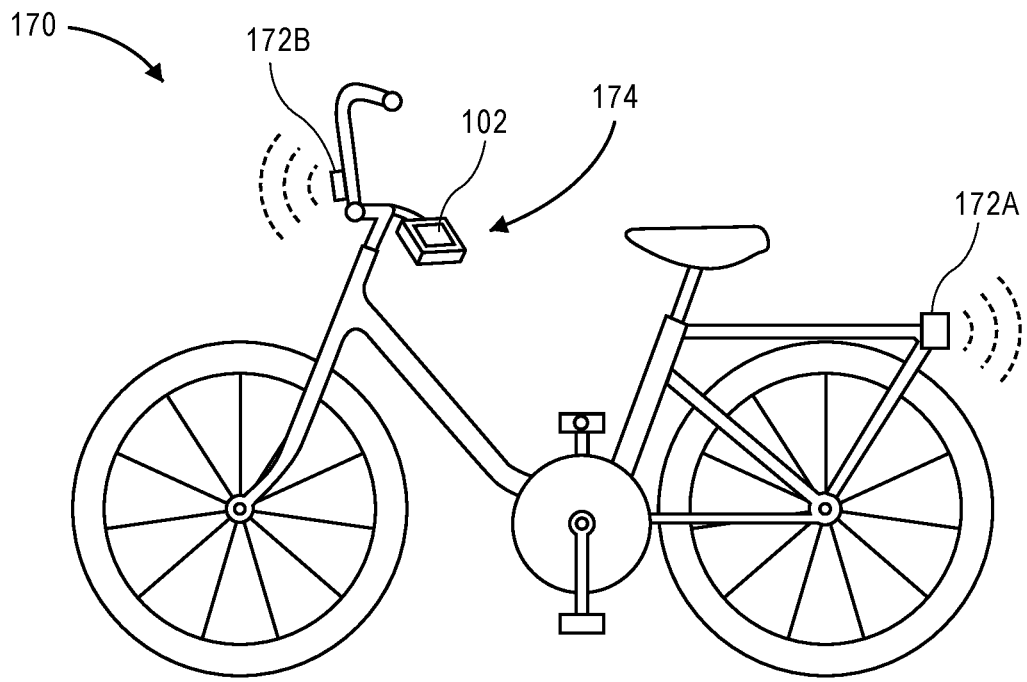
FIGS. 3A through 3D are schematic plan views illustrating an example bicycle environment in which an embodiment of the mobile electronic device shown in FIG. 1 may be employed.
Figure 3B:
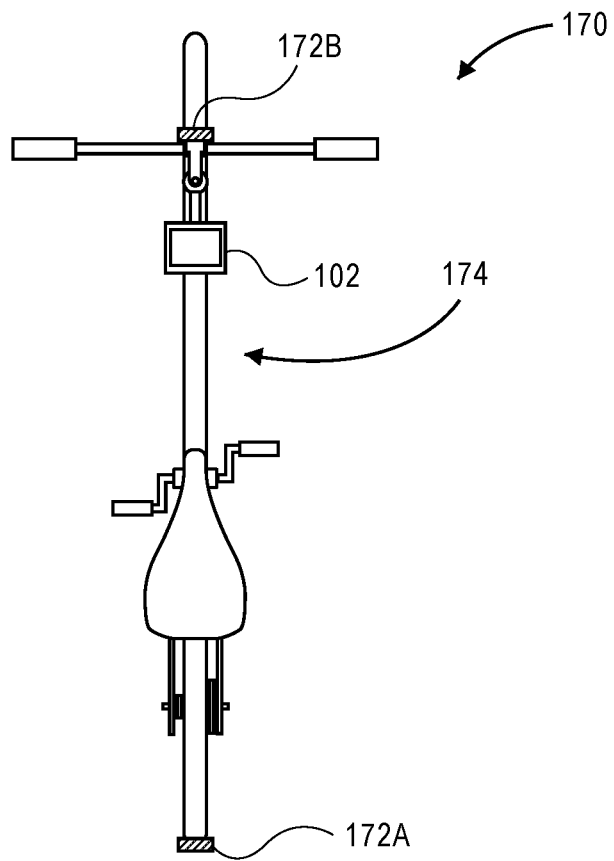

The mobile electronic device 102 and one or more radar sensor housings 172A and 172B may be mounted on or mountable to the bicycle 174. Any of these components may also be configured to fit within a holder or couple to a fixture or accessory that is mounted to the bicycle 174. FIG. 3B shows an embodiment where a first radar sensor housing 172A is mounted to a rear portion of the bicycle 174, a second radar sensor housing 172B is mounted to a front portion of the bicycle 174, and the mobile electronic device 102 is mounted to a steering assembly (e.g., between handlebars) of the bicycle 174 such that the display device 120 is viewable by the cyclist. In other embodiments, the mobile electronic device 102 may not be mounted to the bicycle and may be worn by a user such that its display device 120 may be viewed by a user when desired (e.g., a smart watch (e.g., as shown in FIG. 2), helmet or visor display, smart glasses, etc.).

Figure 3C:
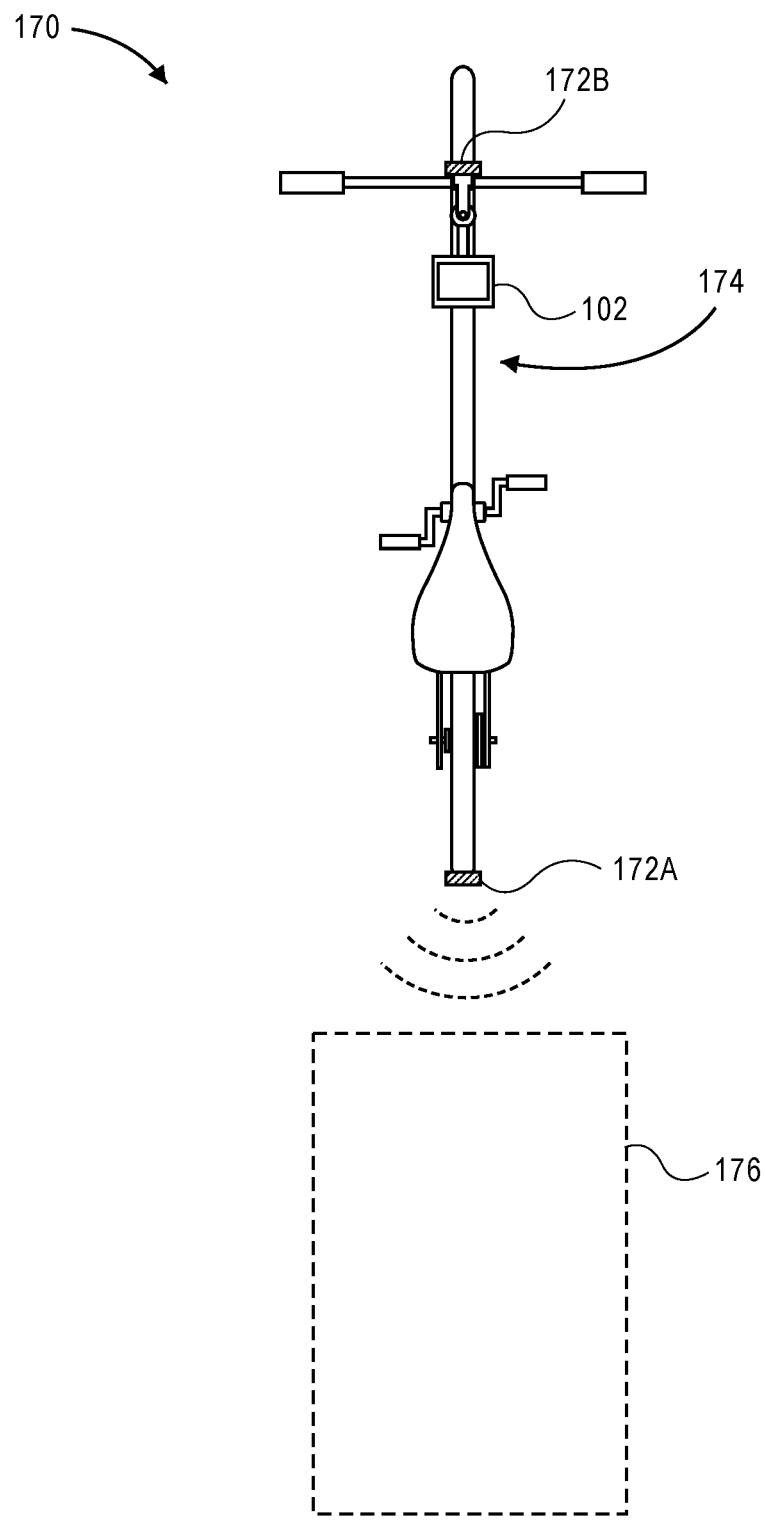
Figure 3D:
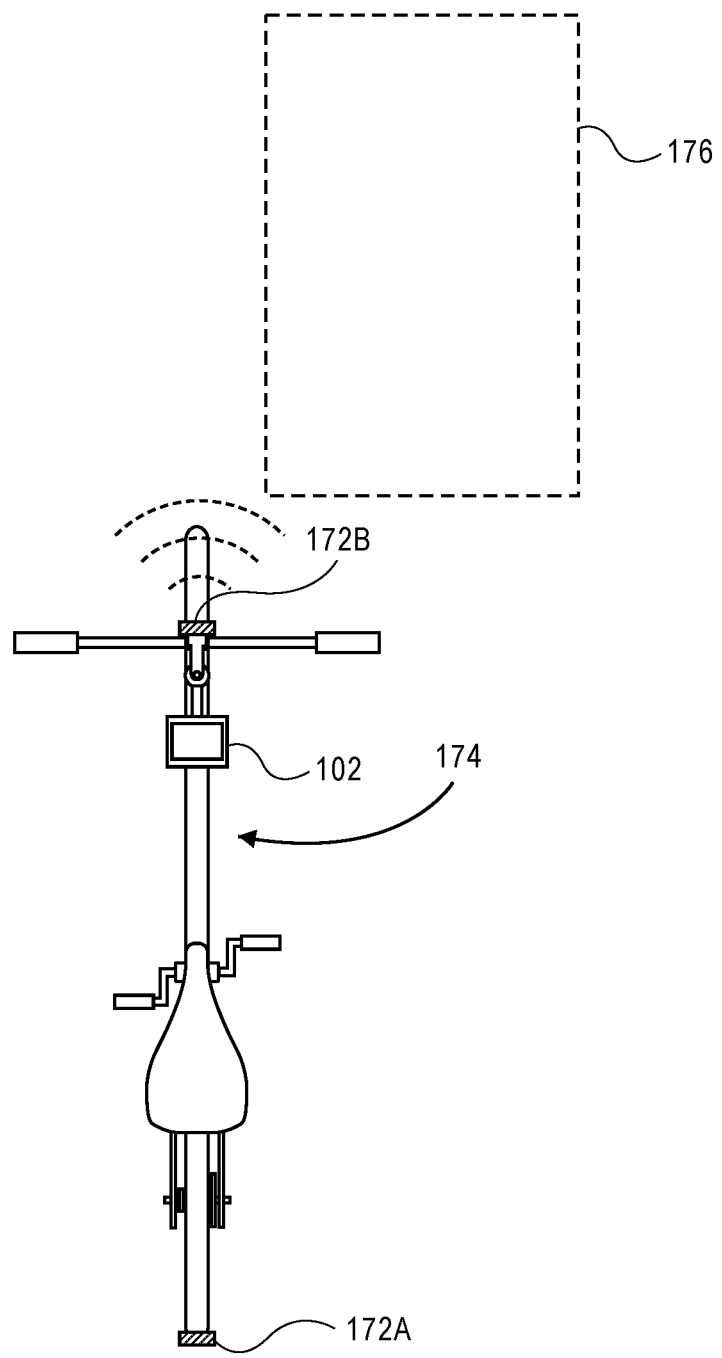

The radar sensor housing (e.g., radar sensor housing 172A or 172B) may be mounted to the bicycle 174 such that a radar sensor within each radar sensor housing may generate a sensor field that is front-facing, back-facing, or facing any other direction as needed. The radar sensors in radar sensor housings 172A, 172B may utilize RADAR (Radio Detection and Ranging), Lidar (Light Detection and Ranging), ultrasonic sensors, as well as video (computer vision) tracking. FIG. 3C shows an example environment in which a target 176 (e.g., a rear-approaching vehicle) is determined, by first processor 104 or the second processor within the radar sensor housing 172, to be located (detected) within a sensor field of a radar sensor within radar sensor housing 172A mounted at the rear of the bicycle 174. FIG. 3D shows an example environment in which a target 176 (e.g., a vehicle or obstacle) is determined, by first processor 104 or the second processor within the radar sensor housing 172, to be located within a sensor field of a radar sensor within radar sensor 172B mounted at the front of the bicycle 174. A plurality of radar sensor housings may be mounted to the bicycle 174 such that a plurality of radar sensors may be used, by first processor 104 or the second processor of the radar sensor system within the radar sensor housing 172, in conjunction to determine a more complete view of the environment as desired by the user.

The radar sensor system 170 is operable to detect objects, vehicles, people, animals, and other targets in proximity to the bicycle 174 within sensor fields directed to any direction of the bicycle 174 to assess and/or present situational awareness indicators or recommendations to the cyclist based on the radar sensor data, including target data corresponding to the objects, vehicles, people, animals, and other targets. For example, as illustrated in FIG. 3C, the radar sensor housing 172A, including a second processor of the radar sensor system 170 and a radar sensor coupled with the second processor, is configured to identify and detect one or more targets 176 that enter a sensor field behind the bicycle. For instance, cars and other bicycles that approach the bicycle 174 from behind may be detected by the radar sensor system 170 based on the returns (reflections) of transmitted radar signal in a sensor field behind the bicycle 174. The mobile electronic device 102 may be configured to wirelessly receive the radar sensor data, including target data corresponding to targets proximate to the bicycle, from a transceiver within the radar sensor housing 172A, determine a location of the one or more targets 176 approach the bicycle from behind and notify the cyclist of the one or more targets 176 by presenting one or more situational awareness indicators on a display device 120. The radar sensor data may include target data (e.g., speed, range, recommended awareness level, azimuth angle, or any other sensed data about a detected target 176) corresponding to a target determined to be present in a sensor field proximate to the bicycle 176. The speed or position of the detected target 176 may be used by first processor 104 to determine an appropriate situational awareness level and/or recommended course of action and then control display device 120 to present that information to the cyclist.

In configurations, the mobile electronic device 102 may be equipped with a vibration motor or audio capabilities. For example, the mobile electronic device 102 may include a speaker 178 or a haptic feedback element 180, such a vibration motor. As discussed herein, alerts, notifications, cues, or other indicators may be displayed in textual words (e.g., "moderate awareness recommended" or "oncoming vehicle"). In addition to providing situational awareness information, such as situational awareness indicators, on a display device 120, the processor 104 of mobile electronic device 102 may be configured to provide such situational awareness information by controlling a speaker 178 to provide audible alerts and communication (e.g., audible output of "moderate awareness recommended" or "oncoming vehicle"), a haptic feedback element 180 to provide haptic feedback of determined situational awareness information (e.g., vibrations, possibly at various intensities or in various patterns), or display device 120 to provide visual communication and effects (e.g., illuminating the display device 120 in meaningful colors or flashing a light).

In embodiments, the first processor 104 of the mobile electronic device 102 may be configured to receive a current geographic position and radar sensor data, including target data corresponding to targets proximate to the bicycle 176 within the sensor field(s) of one or more radar sensors, from the position-determining component 112 and the radar sensor housing (e.g., radar sensor housing 172A or 172B), respectively. The first processor 104 may be configured to cause the display device 120 to present determined location information (e.g., location or geographical position, altitude, or navigation data in text, symbols, a graphical (e.g., map) representation, or the like) independently or in combination with other information. The first processor 104 of the radar sensor system 170 in the mobile electronic device 102 may be further configured to cause the display device 120 to provide situational awareness information or indicators (e.g., text, symbols, or an iconic or graphical representation located on or adjacent to a map, textual, or symbolic representation of the location or positioning data) based on the radar sensor data including target data corresponding to targets proximate to the bicycle received from the radar sensor housing 172A and/or 172B.

In some implementations, the first processor 104 may be configured to cause the display device 120 to simultaneously provide the location information and one or more situational awareness indicators determined based on received radar sensor data, including target data. For example, the first processor 104 may be configured to cause the display device 120 to present a map including an icon associated with a target determined to be present (detected) in a sensor field proximate to the bicycle 176 on the map or first processor 104 may cause the display device 120 to present a tracking bar together with (e.g., next to) the map with an iconic representation of one or more targets determined to be present (detected) within a sensor field proximate to the bicycle 176. The first processor 104 may also be configured to cause the display device 120 to present text, symbols, icons, highlighting, flashing colors, dimmed or brightened portions of a display screen 120, and so forth, to indicate an awareness level (e.g., "low awareness level," "moderate awareness level," or "high awareness level") associated with one or more targets determined to be present (detected) within a sensor field proximate to the bicycle 176.

FIGS. 4A through 4I show exemplary user interfaces that may be presented on the mobile electronic device 102. The mobile electronic device 102 is configured to present situational awareness information to the cyclist to aid the user with riding his bicycle 176 based on an increased awareness of his or her surroundings. FIG. 4A shows a display screen 200 in accordance with an implementation of this disclosure. In embodiments, the first processor 104 in the mobile electronic device 102 causes the display device 120 to present one or more situational awareness indicators on the display screen 200. The display screen 200 may include a status bar 202 with iconic status indicators, time, temperature, and so forth. The display screen 200 can also include a start (e.g., "Ride") selection button 204, an activity profile selector 206, iconic selection buttons 208 for "Where To?" (e.g., routing-related options, such as points of interest or route selections), "Calendar" (e.g., calendar access), "History" (e.g., information about search history or other historical use information), "Courses" (e.g., information or options related to courses such as courses available for download or courses that were previously completed, viewed, or saved), "Segments" (e.g., information or options related to segments such as segments available for download or segments that were previously completed, viewed, or saved), "Workouts" (e.g., information or options related to workouts such as workouts available for download or workouts that were previously completed, viewed, or saved), and other user interface menus and options, a settings icon 210, and so forth.

In embodiments, mobile electronic device 102 may include one or more sensors, such as a temperature sensor, speed sensor, accelerometer, gyroscope, physiological sensor (e.g., heartrate sensor) for the user, and so forth, to provide first processor 104 additional information that may be used to determine situational awareness indicators based on the received radar sensor data, including target data, and the information provided by the sensors within mobile electronic device 102. For example, sensor connectivity may be indicated in the status bar 202 shown in FIG. 4B. The display screen 200 can also show sensor connection status 214, target status, or target distance. Once a user input associated with the "Ride" user interface option (selection 204) is received (e.g., touch screen 122 receives a touch input in a region associated with the "Ride" button), first processor 104 may cause the display screen 200 to present information to a user (the cyclist) based on data provided by the one or more sensors in the mobile electronic device 102. For example, FIGS. 4C and 4D show "Data Fields" 212 that can include information received from various sensors, such as the position-determining component 112, internal sensors, or received via the communication component 126 (e.g., a wireless transceiver) from external sensors (e.g., mounted to the bicycle, worn by the user, etc.) or the one or more radar sensor housings (e.g., radar sensor housings 172A and 172B).

When an incoming target, such as a vehicle or bicycle approaching from behind is sensed, first processor 104 may determine one of more situational awareness indicators, which may be in the form of icons, changes in color or display brightness, text, symbols, or the like, and cause the display device 120 to present the one or more situational awareness indicators. For example, first processor 104 may cause display screen 200 to show at least one situational awareness indicator using dots representative of the detected target, the cyclist, color-coded awareness indicators (e.g., badges or banners), changes in brightness or dimming of portions of the display screen 200, or any other visual indicator to communicate the determined presence of one or more targets in sensor fields proximate (radar sensors facing behind the bicycle 176, in front of the bicycle 176, to the right side of the bicycle 176, to the left side of the bicycle 176, or any combination thereof) to the bicycle 176 ridden by a user.

In some implementations, the display screen 200 may show a first indicator, such as tracking bar 216, to indicate the presence of a target determined to be present (detected) within a sensor field of one or more radar sensors of the radar sensor system 170 (e.g., a vehicle or other target approaching from behind). The display screen 200 can also show additional indicators, such as one or more icons (e.g., dots 218 and 220), to illustrate nearness of a detected target relative to the user's bicycle 176 (e.g., a separation between a first dot 218 representing the cyclist and a second dot 220 representing a determined position (detected) of target in the sensor field). The display screen 200 can show icons (e.g., dots 218 and 220) on the tracking bar 216. In some implementations, the display screen 200 can show the tracking bar 216 adjacent to data fields 212 or adjacent to a map showing route guidance for the cyclist. In other implementations, the display screen 200 can show the situational awareness icons (e.g., dots 218 and 220 or other icons representative of the cyclist and detected targets) directly on a map showing route guidance from a starting location to a destination.

In some implementations, a situational awareness indicator determined by first processor 104 is a brightness or color of at least a portion of an edge (e.g., edge 222A or 222B) of the display screen 200 or navigational information (turn arrow) presented on the display screen 200, and the first processor 104 is configured to cause a change in brightness or color of an edge or navigational information to provide a situational awareness level to the cyclist. For example, the display screen 200 can indicate a low level of recommended awareness with a slight change in brightness or dimming of edge 222A and/or 222B, and greater changes in brightness or dimming of edge 222A and/or 222B can indicate higher levels of recommended awareness such as when a vehicle is rapidly approaching or is very nearby to the cyclist. The display screen 200 may also indicate a low level of recommended awareness by changing a color at edge 222A and/or 222B or navigational information (turn arrow) to a low awareness color such as green and may indicate higher levels of recommended awareness by changing a color at edge 222A and/or 222B or navigational information (turn arrow) to a moderate awareness color such as yellow, or to a high awareness color such as red.

Awareness progression or target tracking is further illustrated in FIGS. 4E through 4I. As shown in FIG. 4E, a tracking bar 216 may be displayed along an edge of the display screen 200 over the various data fields or other data shown on the display screen 200. Upon receiving measurements from one or more of the radar sensors (e.g., radar sensors 172A and 172B) indicating that a target (e.g., an approaching vehicle) is determined to be present (detected) within a sensor field, the first processor 104 may be configured to present the identified target as a dot 220 along the tracking bar 216 to indicate that the target is detected within a first distance from the cyclist as shown in FIGS. 4E-4H. The first processor 104 may be further configured to cause the display device 120 to illuminate at least one edge of the display screen 200 or navigational information (turn arrow) presented on the display screen 200 in a first color (e.g., orange) or change its brightness and to alert the cyclist that he or she may wish to exercise a slightly-heightened level of awareness (e.g., moderate awareness level), as shown in FIG. 4F, while riding the bicycle 176.

The first processor 104 can also be configured to cause the display device 120 to illuminate at least one edge of the display screen 200 or navigational information (turn arrow) presented on the display screen 200 in a second color (e.g., red) or change its brightness (e.g., brighter or dimmer than the edge in display screen 200 of FIG. 4F) and display the target as a dot 220 along the tracking bar 216, closer to the dot 218 (representative of the cyclist), to indicate that the detected target is very near the cyclist and to alert the cyclist that he or she may wish to exercise a heightened level of awareness (e.g., high awareness level), as shown in FIG. 4G. Upon receiving radar sensor data (measurements) from one or more of the radar sensor housings (e.g., radar sensor housings 172A and 172B), including one or more radar sensors having sensor fields in directions associated with the transmitting face of the radar sensors, indicating that the target is no longer present in a sensor field (because the target has passed), the first processor 104 may be configured to illuminate at least one edge of the display screen 200 or navigational information (turn arrow) presented on the display screen 200 in a third color (e.g., green) or change its brightness (e.g., less drastically than in FIG. 4F or 4G) to indicate a lower awareness level and can cause the display screen 200 to show no target dot 220. FIG. 4I illustrates a high awareness level, where the first processor 104 causes the display device 120 to illuminate at least one edge of the display screen 200 or navigational information (turn arrow) presented on the display screen 200 in a high awareness color (e.g., red) or drastically change its brightness and display multiple targets as dots 220 along the tracking bar 216, indicating that there are numerous detected targets at varying distances from the cyclist (represented by dot 218).

FIGS. 5A through 5C show an example user interface workflow to notify the cyclist that communication with transceiver coupled with a sensor (e.g. radar sensors within radar sensor housings 172A or 172B) has been lost or otherwise disconnected. In FIG. 5A, the display screen 200 is shown with data fields 212 and sensor status indicator icon 214, indicating that a sensor is wirelessly connected to the mobile electronic device 102. Sensor status indicator icon 214 may be presented or shaded in a color (e.g., green) to indicate connectivity. In some implementations, the first processor 104 is configured to cause the display device 120 to indicate that a wireless connection with a transceiver (within radar sensor housings 172A or 172B) coupled with one or more radar sensors is active (connected) or disconnected from the mobile electronic device 102 by changing the color or shading (indicated by line thickness in FIGS. 5A through 5C) of sensor curves in the sensor status indicator icon 214 shown on the display screen 200.

For example, in FIG. 5B, the display screen 200 shows the sensor status indicator icon 214 having a color (e.g., orange) and/or bolder shading than shown in FIG. 5A indicative of sensor disconnectivity and shows a sensor badge at the bottom of the screen 200 to indicate that the radar sensor housing (e.g., radar sensor housing 172A or 172B) has been disconnected from the mobile electronic device 102. The notification can comprise icons, such as the sensor status indicator icon 214, a written message, such as "Sensor has been disconnected," or any other sort of visual or auditory indication. After a period of time, the first processor 104 may be configured to cause the display device 120 to remove the notification badge 215. For example, between FIGS. 5B and 5C, the notification is dismissed, and the notification badge 215 is no longer shown at the bottom of the display screen 200 in FIG. 5C. Until sensor connectivity is reestablished, the first processor 104 may be configured to cause the display device 120 to continue displaying the sensor status indicator icon 214 displayed in the low connectivity color (e.g., orange) or with symbol shading to indicate that the radar sensor housing (e.g., radar sensor housing 172A or 172B) is still not connected to the mobile electronic device 102.

In some implementations, the mobile electronic device 102 is configured to store information related to determined positions of targets in sensor fields proximate to the bicycle and determined awareness levels at various locations and along various routes. The stored data may be used by the first processor 104 of the mobile electronic device 102 when calculating a route to a destination and/or uploaded to a web- or cloud-based environment, such as GARMIN CONNECT, to be stored for future use or shared with others. For example, the mobile electronic device 102 can download information, using communication component 126, that is shared with other users or uploaded into a web-based interface, such as GARMIN CONNECT, or other web- and/or cloud-based environment. This awareness data may be used to enhance cycling specific map data or routing algorithms to provide more "cyclist-friendly" or popular routes and recommend areas for cyclists. The awareness data may be displayed in various manners, such as coloring the route lines or the background to indicate the relative awareness level of the route. The awareness information may be used on a calculated route to display the awareness level of upcoming turns. This information may be based on the probability of oncoming vehicles or obstacles, historical data, internal map data, downloaded or dynamic data, or any other appropriate information or sensed data.

In configurations, mobile electronic device 102 may transmit information relating to upcoming turns along to a route to a destination to the radar sensor housings 172A, 172B. The information about upcoming turns may be used in conjunction with cartographic data, radar sensor data (including target data corresponding to targets proximate to the bicycle), or other available data to activate a light (e.g., one or more LEDs that may be illuminated to indicate directional changes or the presence of bicycle 176 to others traveling along the same road or path) within the radar sensor housings 172A and 172 to notify nearby targets (vehicles or other bicycles) that the cyclist intends to turn a certain direction. For instance, the light integrated within radar sensor housing 172A, 172B may illuminate one or more LEDs in a solid or flashing red or amber color to indicate directional changes or the presence of bicycle 176 to others on the road or path. After the first processor 104 or the second processor of the radar sensor system 170 determine that the bicycle 176 has completed the turn, the first processor or the second processor may deactivate the blinker. In embodiments, the intensity and/or flicker rate or pattern of a light integrated within radar sensor housing 172A, 172B may be determined by first processor 104 or second processor based on whether a target (vehicle or bicycle) is determined to be approaching user's bicycle 176 is determined to be present. In embodiments, the intensity and/or flicker rate or pattern of an integrated light may be determined by first processor 104 or second processor based on a determined characteristics (e.g. speed and acceleration) of the target (vehicle or bicycle) on the road being traveled by the user's bicycle 176. For instance, the intensity of the light may be greater if first processor 104 or second processor determines that a target is quickly approaching the bicycle by traveling at a velocity or rate of acceleration at a rate that exceeds a threshold speed stored in memory 106 or that the target has changed directions (e.g., changed lanes) and is now in a position that may cause the target to travel by the bicycle 176 as it passes by bicycle 176.

If radar sensor housing 172B is facing forward (in front of bicycle 176), the light integrated therein may serve as a headlight. In embodiments, the headlight's beam may be adjusted depending on anticipated directional changes or based on whether a vehicle is determined to be approaching in front of bicycle 176.

For example, turn-by-turn navigation on the mobile electronic device 102 along a route to a destination may instruct the cyclist to turn left in approximately 100 feet. If the first processor 104 or the second processor of the radar sensor system 170 detect a target in a sensor field of a radar sensor (within radar sensor housings 172A and 172B) approaching or otherwise present around the bicycle 176, the turn arrow presented on display device 120 of the mobile electronic device 102 may be shown in an appropriate color to indicate the corresponding awareness level (e.g., red for high awareness, and so on) and the light (e.g., one or more LEDs) within radar sensor housings 172A, 172B may be activated. The mobile electronic device 102 may transmit information related to the upcoming turn to a radar sensor housing 172 or 172B, causing a light (e.g., one or more LEDs) integrated within the radar sensor housing 172 or 172B to blink (periodically illuminate) on the left-hand side to indicate to other cyclists or motorists that the cyclist intends to turn left. The light may similarly blink on the right-hand side to indicate a right turn, when necessary. Once the first processor 104 or the second processor of the radar sensor system 170 determine that the bicycle 176 has completed the left turn (or if the turn point is passed and the route recalculates), the communication component 126 (a transceiver) mobile electronic device 102 may wirelessly transmit the new information to the radar sensor housings 172A, 172B, causing the light in the radar sensor housing to stop blinking, indicating to other cyclists or motorists that there is no upcoming turn planned at that time.

FIGS. 6A through 6G show an example user interface illustrating awareness determined by first processor 104 for an upcoming turn based on radar sensor data including target data corresponding to targets proximate to the bicycle and, in some implementations, employing one or more situational awareness indicators such as the tracking bar 216, changes in brightness or color of at least one edge (e.g., edges 222A and 222B) of the display screen 200 or navigational information (turn arrow) presented on the display screen 200, providing other audible, haptic, or visual indicators, or a combination thereof. In embodiments, the processor (e.g., first processor 104) can cause the display device 120 of the mobile electronic device 102 to provide the one or more situational awareness indicators on the display screen 200, as illustrated in FIGS. 6A through 6G.

In some implementations, the first processor 104 is configured to cause the display device 120 to present a route 224 and an icon 226 (e.g., triangle) indicative of the cyclist's position on the route 224, as shown in FIG. 6A. The display screen 200 may also show a street name 228, route name, or other geographic data. The first processor 104 can also cause the display device 120 to show guidance information on the display screen 200. For example, the display screen 200 in FIG. 6B shows directions for the cyclist to make a left turn ahead. In some implementations, the display screen 200 may show an arrow 232 on the route 224 and a "left turn" icon 230 in the upper left corner of the display screen 200. In this example, icon 230 is shown with distance (e.g., 300 ft) to the left turn. The display screen 200 shows the sides (e.g., edges 222A and 222B) of the display screen 200 illuminated in a low awareness color (e.g., green) or navigational information (turn arrow) presented on the display screen 200 to indicate that the awareness level is low for this turn. The tracking bar 216 is not displayed in FIG. 6B because no targets are sensed (e.g., no targets are determined to be present (detected) in a sensor field proximate to the bicycle 176).

When the processor receives a radar sensor data, including target data corresponding to targets proximate to the bicycle, from a radar sensor housing (e.g., radar sensor housings 172A or 172B including radar sensors coupled with a transceiver) indicating that a target may be present nearby, as shown in FIG. 6C, the first processor 104 may be configured to cause the display device 120 to illuminate the sides (e.g., edges 222A and 222B) of the display screen 200 or navigational information (turn arrow) presented on the display screen 200 in a moderate awareness color (e.g., orange) to indicate that the awareness level is moderate for this turn. The first processor 104 may be configured to cause the display device 120 to show the tracking bar 216 on the display screen 200 to indicate a detected target (e.g., a rear-approaching vehicle) as a dot 220. The distance from the cyclist to the target determined to be present in a sensor field is represented by the position of the dot 220 on the tracking bar 216, relative to dot 218 representing the cyclist. In FIG. 6D, the sides (e.g., edges 222A and 222B) of the display screen 200 or navigational information (turn arrow) presented on the display screen 200 are illuminated in a high awareness color (e.g., red) to indicate that the awareness level is high, for example, because the detected target is nearer to the cyclist or approaching at a faster speed than in the example shown in FIG. 6C.

FIGS. 6E through 6G show an example user interface, wherein the first processor 104 is configured to cause the display device 120 to show situational awareness indicators (e.g., changing brightness or color of edges 222A and 222B or navigational information (turn arrow) presented on the display screen 200) on the display screen 200 along a sample route utilizing awareness data incorporated into other data, such as cartographic data. FIGS. 6E through 6G show a sample route wherein the cyclist is directed to make a left turn ahead. In embodiments, navigational instructional images or information may be shown on the display screen 200. For example, a left turn arrow 232 and a triangle 226 that represents the cyclist in his or her current position may be shown on the route 224. A distance indicator 212A may also be shown to indicate that the left turn is approximately 300 feet ahead of the cyclist. A time indicator 212B may also be shown to indicate that the left turn is approximately 20 seconds ahead of the cyclist based on his or her current speed and location. Textual instructions with a street name 228 (e.g., "Left on Indian Creek Trail") may be shown to guide the cyclist on the route 224. One or more navigational selections 234 (e.g., "Tap to go back") may be shown to allow the cyclist to make changes to the route or stop routing.

The display screen 200 in FIG. 6E shows a sample route wherein the cyclist is directed to make a left turn ahead. In FIG. 6E, the sides of the display screen 200 are illuminated in a low awareness color (e.g., green) to indicate that the turn is a low awareness turn. In FIG. 6F, the sides of the display screen 200 are illuminated in a moderate awareness color (e.g., orange) to indicate that the turn is a moderate awareness turn. In FIG. 6G, the sides of the display screen 200 are illuminated in a high awareness color (e.g., red) to indicate that the turn is a high awareness turn.

Figure 7:
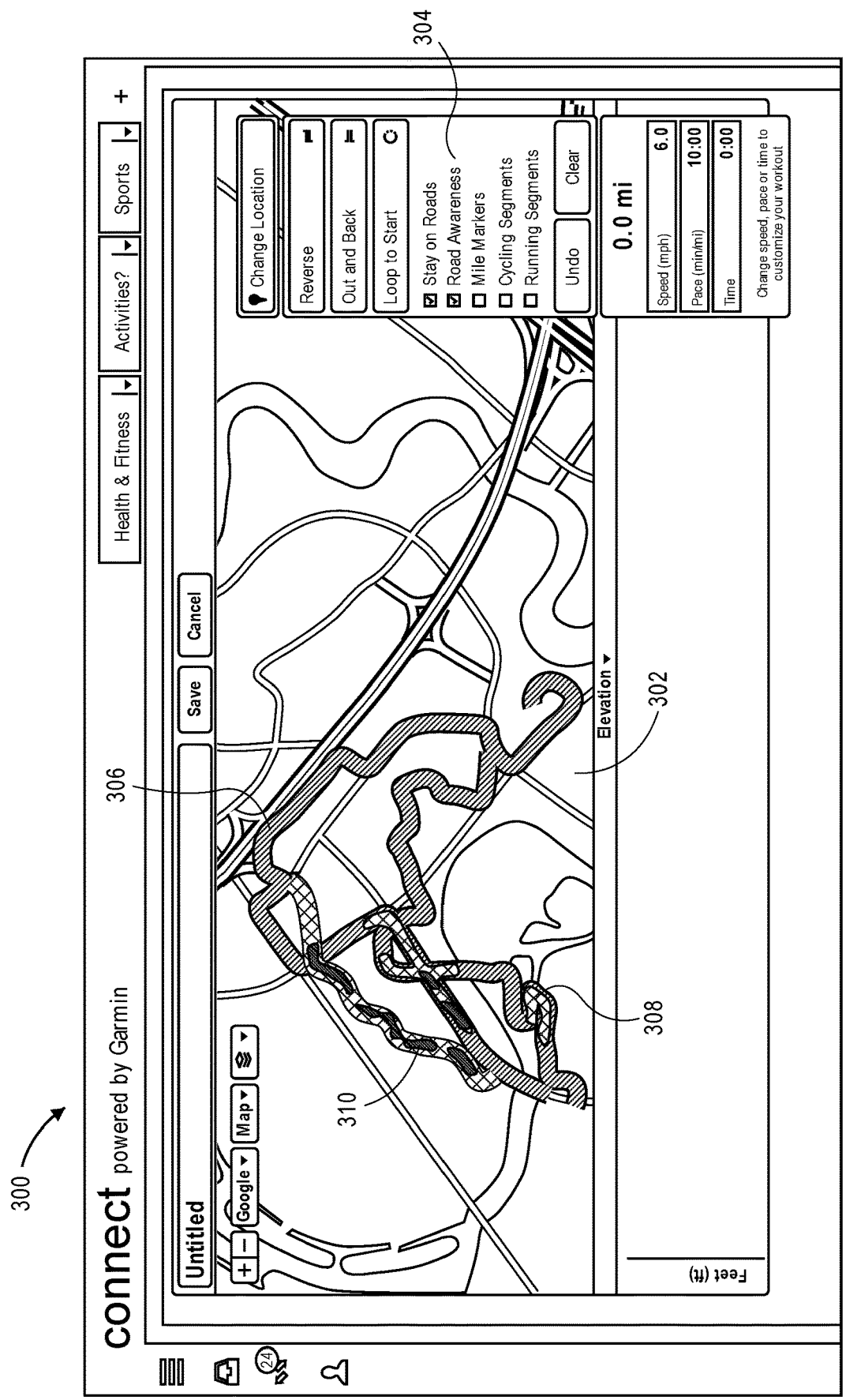
FIG. 7 is a diagrammatic view illustrating an example screen display of a computer system.

FIG. 7 illustrates an example of a situational awareness analysis implemented in one or more geographic areas. For example, the first processor 104 may be configured to cause the display device 120 to show a web portal 300. In embodiments, the web portal, such as a GARMIN CONNECT portal or the like, shows a map 302 for viewing and sharing data. The mobile electronic device 102 can also show the map 302 via a mobile application running on the mobile electronic device 102, such as GARMIN CONNECT mobile application or the like. The map 302 may include roads and trails illuminated or partially highlighted in high awareness color (e.g., red) shading 310, moderate awareness color (e.g., yellow) shading 308, or low awareness color (e.g., green) shading 306 to display a relative situational awareness level. In an example implementation, red trails and roads have higher situational awareness levels than yellow trails and roads, and yellow trails and roads have higher situational awareness levels than green trails and roads. Any number of situational awareness levels may be implemented using different colors, shading options, or the like. This may allow the cyclist to optimize their route based on awareness data if they wish. For example, a cyclist can view route characteristics based on map overlays controlled via a selection menu 304 accessed through the web portal 300, and the cyclist can then choose a route having a desirable set of characteristics.

Figure 8:
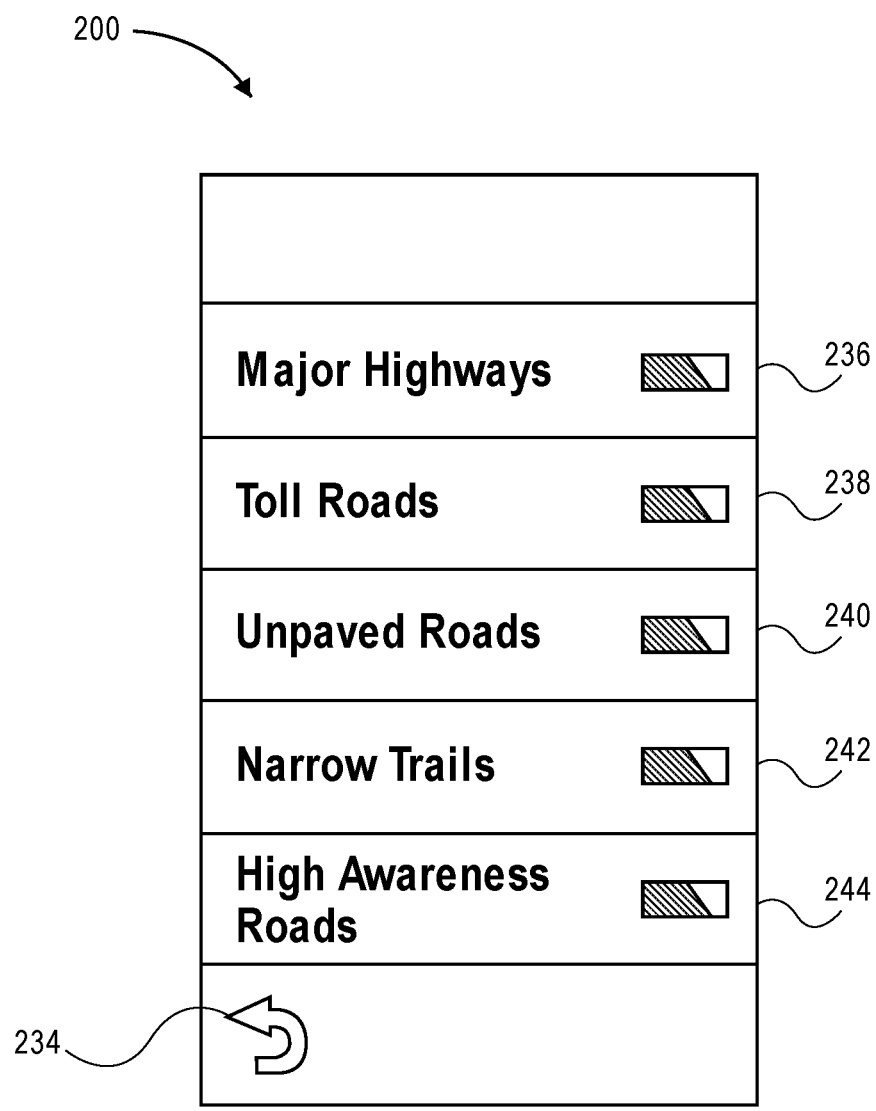
FIG. 8 is a diagrammatic view illustrating an example screen display of the mobile electronic device of FIG. 1.

The first processor 104 can also cause the display device 120 to present a menu with selectable options (e.g., selections 236, 238, 240, 242, 244) on the display screen 200 (as shown in FIG. 8) to allow a cyclist to configure the mobile electronic device 102 to avoid certain types of obstacles, trails, or roads, including high awareness roads within the data used by or available to the mobile electronic device 102 at the time of route calculation or creation. The user may select or deselect the selection (e.g., selections 236, 238, 240, 242, 244) associated with one or more type of obstacle, trail, or road to avoid such obstacles, trails, or roads based on personal preference. For example, the user may choose to avoid roads that have been categorized as high awareness roads by selecting the "High Awareness Roads" selection 244.

In some implementations, the first processor 104 can also be configured to cause the display device 120 to present distance or approach information for detected targets or cyclists. The first processor 104 can also be configured to cause the display device 120 to present textual, symbolic, or iconic indications, and/or change a color or brightness of a selected edge of the display screen 200 to indicate a target approaching from a particular direction. For example, the display screen 200 in FIGS. 9A through 9D presents information about approaching vehicles or other detected targets in the vicinity of the cyclist. The display screen 200 in FIG. 9A indicates an approaching target as dot 220 on the tracking bar 216. The display screen 200 presents distance information 248 next to the dot 220 in text (e.g., indicating that the target is 400 feet from the cyclist, which is represented by dot 218 on the tracking bar 216). The target dot 220 in FIG. 9A is centered on line 246, indicating that the target is approaching from the rear of the cyclist. The first processor 104 may be configured to cause the display device 120 to illuminate both edges 222A and 222B of the display screen 200 or navigational information (turn arrow) presented on the display screen 200 in an awareness level indicative color (e.g., red, yellow, or green) and/or brighten or dim the edges 222A and 222B or navigational information (turn arrow) presented on the display screen 200 to indicate an awareness level and to indicate that the target is approaching from the rear of the cyclist.

The display screen 200 presents the dot 220 to the left of line 246 in FIG. 9B to indicate that the target is approaching from the left of the cyclist. The first processor 104 may be configured to cause the display device 120 to illuminate the left edge 222A of the display screen 200 or navigational information (turn arrow) presented on the display screen 200 in an awareness indicative color (e.g., red, yellow, or green) and/or brighten or dim the left edge 222A to indicate an awareness level and to indicate that the target is approaching from the left of the cyclist. The display screen 200 shows the dot 220 to the right of line 246 in FIG. 9C to indicate that the target is approaching from the right of the cyclist. The first processor 104 may be configured to cause the display device 120 to illuminate the right edge 222B of the display screen 200 or navigational information (turn arrow) presented on the display screen 200 in an awareness indicative color (e.g., red, yellow, or green) or brighten or dim the right edge 222B to indicate an awareness level and to indicate that the target is approaching from the right of the cyclist.

When there are multiple approaching targets detected, the display screen 200 can display a plurality of dots 220A, 220B, and 220C on the tracking bar 216 as shown in FIG. 9D. The display screen 200 can also show distance information next to each dot (e.g., in text indicating that, from top to bottom, the targets are 300 feet, 350 feet, and 400 feet, respectively, from the cyclist). The top dot 220A is to the left of line 246, indicating that its respective target is approaching from the left of the cyclist. The middle dot 220B is centered on line 246, indicating that its respective target is approaching from the rear of the cyclist. The lower dot 220C is to the right of line 246, indicating that its respective target is approaching from the right of the cyclist. The first processor 104 may also be configured to cause the display device 120 to illuminate both the left edge 222A and the right edge 222B of the display screen 200 or navigational information (turn arrow) presented on the display screen 200 in an awareness level indicative color (e.g., red, yellow, or green) and/or brighten or dim the left edge 222A and the right edge 222B or navigational information (turn arrow) presented on the display screen 200 of the display screen 200 to indicate an awareness level and indicate that targets are approaching from one or more directions.

In implementations, the radar sensor system 170 may be used to determine the presence of (e.g., with radar sensor housings 172A and 172B including radar sensors) other cyclists, either independent cyclists or cyclists within groups. The mobile electronic device 102 may also be configured to receive information from bicycle computers or other mobile electronic device(s) operated by the other cyclists. Once other cyclists are detected, the first processor 104 may be configured to cause the display device 120 to indicate to the cyclist a determined distance between bicycle 176 and the other cyclists or group of cyclists. For example, the first processor 104 may be configured to perform time gap calculations that may be presented to notify the cyclist how soon the other cyclists or group of cyclists will catch up or how soon the cyclist will catch up to the other cyclists or group of cyclists based on current and past speeds of each bicycle, including bicycle 176. The first processor 104 may be configured to determine a distance between the cyclist and a detected target such as another cyclist or other detected target based on radar sensor data including target data corresponding to targets proximate to the bicycle, positioning data (e.g., the current geographic position of the bicycle from the position determining component 112), other sensor data, or a combination thereof, and can also be configured to determine relative speeds of the cyclist and the detected target. Using the distance and relative speed measurements, the first processor 104 can calculate a time gap (e.g., time needed for the cyclist to reach the detected target, or vice versa).

The first processor 104 can cause the display device 120 to show an iconic, symbolic, or textual notification to the cyclist as shown in FIGS. 10A through 10C, wherein the display screen 200 provides time gap data for detected targets (e.g., cyclists) that are to the front or rear of the cyclist. The display screen in FIG. 10A shows a sample route 224 with an icon 226 (e.g., triangle) representative of the cyclists location on the route 224. The display screen in FIG. 10B shows sides (e.g., edges 222A and 222B) of the display screen 200 illuminated to indicate an awareness level (e.g., illuminated in orange to indicate a moderate awareness level) and to indicate that there is a target approaching from the rear. The display screen 200 also shows the tracking bar 216 with a dot 220 indicating the rear-approaching target on the tracking bar 216. The display screen 200 also shows a dot 250 indicating the rear-approaching target behind the cyclist icon 226 on the route 224. The display screen 200 shows time gap information 252 to the cyclist based on sensed data, including, but not limited to, speed and distance. For example, the display screen 200 shows that a rear-approaching cyclist is approximately thirty seconds behind the cyclist. When a target has been detected or otherwise identified in front of the cyclist, the display screen 200 may or may not show the tracking bar 216 because the cyclist may be capable of seeing the target in front of them, thus making it unnecessary to show the tracking bar 216. For example, FIG. 10C shows the display screen 200 without the tracking bar 216, as the detected target (shown as dot 250) is in front of the cyclist and, as such, should be within the cyclist's view.

In implementations, the first processor 104 is also configured to cause the display device 120 to present selectable menus on the display screen 200 for communicating with or adding new sensors, as shown in FIGS. 11A through 11C. For example, the display screen 200 shows a system menu in FIG. 11A that shows a selection 256 associated with "Sensors" to navigate to a sensor-specific menu. The display screen 200 can show other menu selections such as, but are not limited to, an "Activity Profiles" selection 254, a "Bluetooth" selection 258, a "Device Transfers" selection 260, a "Wi-Fi" selection 262, a "System" settings/information selection 264, navigational selections 234 (e.g., scrolling and return buttons) and so forth.

In the sensor-specific menu shown in FIG. 11B, the display screen 200 lists previously paired or presently connected sensors (e.g., sensors 266A, 266B, 266C, and 266D) with names or other identifiers, either system-selected, default values, or user-specified. The display screen 200 also shows an "Add Sensors" selection 268 to allow the user to add a new (not currently paired or connected or listed as a previously paired or connected) sensor. The display screen 200 can provide pre-defined sensor types when selection 268 is made to add a new sensor.

For example, after first processor 104 determines that the "Add Sensors" user interface option has been selected, as shown in FIG. 11B, the user may see the display screen 200 depicted in FIG. 11C that shows a menu with a "Bike Lights" selection 272 (e.g., for a GARMIN™ VARIA™ smart bike light device or the like), a "Cadence" selection 274 (e.g., for a GARMIN™ CADENCE sensor or the like), an "Edge Remote" selection 276 (e.g., for a GARMIN™ EDGE remote control or the like), a "Heart Rate" selection 278 (e.g., for a GARMIN™ VIVOFIT fitness band with heart rate monitoring capabilities or the like), and a "Power" selection 280 (e.g., for a GARMIN™ VECTOR product or the like). Upon selection of a sensor type, the display screen 200 may provide the user with the appropriate setup menu for the selected sensor type. The display screen 200 can also provide a "Search All" selection 270 that causes the first processor 104 to search for a user-input sensor type in a catalogue that may be stored in memory 106 or retrieved from a remotely located database (e.g., accessible through internet provider 130). In an example use case, if the user presses "Bike Lights," the mobile electronic device 102 may guide the user through the bike light setup process with a menu or user workflow specific to setting up a bike light.

In accordance with various embodiments, the radar sensor system 170 described herein may be implemented by the mobile electronic device 102 or any other device having a first processor 104 with access to a position-determining component 112 and radar sensors (e.g., radar sensors 172A and 172B). For example, the first processor 104 can cause the display device 120 to operate in accordance with various implementations described herein (e.g., those illustrated in FIGS. 3A through 11C) based on various sensor inputs from one or more sensors in the mobile electronic device 102, such as the position-determining component 112, sensors in communication with the mobile electronic device 102, such as radar sensors 172A and 172B, or a combination of integrated and communicatively coupled sensors.

The foregoing detailed description of various embodiments of the present technology references the accompanying drawings which illustrate specific embodiments in which the technology may be practiced. The embodiments are intended to describe aspects of the technology in sufficient detail to enable those skilled in the art to practice them. Other embodiments may be utilized and changes may be made without departing from the scope of the technology. The forgoing detailed description is, therefore, not to be taken in a limiting sense. The scope of the present technology is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, and so forth described in one embodiment may also be included in other embodiments, but is not necessarily included. Thus, the present technology can include a variety of combinations and/or integrations of the embodiments described herein.

Although the technology has been described with reference to the embodiments illustrated in the attached drawing figures, equivalents may be employed and substitutions made herein without departing from the scope of the technology as recited in the claims. For example, the components described herein need not be physically connected to one another since wireless communication among the various depicted components is permissible and intended to fall within the scope of the present invention. Components illustrated and described herein are merely examples of a device and components that may be used to implement the embodiments of the present invention and may be replaced with other devices and components without departing from the scope of the invention.

What is claimed is:

1. A mobile electronic device implementing a radar sensor system for a bicycle, the mobile electronic device comprising:
   a position-determining component configured to determine a current geographic position of the bicycle;
   a wireless transceiver configured to receive radar sensor data from a radar sensor of the bicycle;
   a display; and
   a processor coupled with the position-determining component, the wireless transceiver, and the display, the processor configured to
   determine one or more situational awareness indicators based on the received radar sensor data, and
   cause the display to simultaneously present (a) a navigation map corresponding to the current geographic position of the bicycle from the position-determining component and (b) the one or more determined situational awareness indicators,
   wherein the received radar sensor data includes target data and the processor is configured to cause the display to present a first situational awareness indicator when a first target is determined to be within a first distance from the bicycle based on the received radar sensor data,
   wherein the first situational awareness indicator is a tracking bar with an icon illustrative of a determined location of the first target based on the received radar sensor data, the tracking bar extending substantially along one side of the display.

2. The mobile electronic device as recited in claim 1, wherein the received radar sensor data includes target data and the processor is configured to cause the display to provide a dynamic representation of the distance between the first target and the bicycle by presenting the icon illustrative of the determined location of the first target and a second icon illustrative of the bicycle.

3. The mobile electronic device as recited in claim 1, wherein the received radar sensor data includes target data and the situational awareness indicator is a brightness or color of at least one portion of a first edge of the display or navigational information presented on the display to indicate an awareness level associated with a first target detected in proximity to the bicycle based on the radar sensor data.

4. The mobile electronic device as recited in claim 3, wherein the processor is configured to:
   cause a change in brightness or color of the at least one portion of the first edge of the display or navigational information presented on the display when the received radar sensor data includes target data indicating a first target located in a first direction associated with the first edge; and
   cause a change in brightness or color of at least a portion of a second edge the display or navigational information presented on the display when the received radar sensor data includes target data indicating a second target located in a second direction associated with the second edge.

5. The mobile electronic device as recited in claim 1, wherein the received radar sensor data includes target data and the processor is configured to cause the display to provide a time gap between the bicycle and a target located in proximity to the bicycle based on the received radar sensor data.

6. The mobile electronic device as recited in claim 1, wherein the wireless transceiver is further configured to simultaneously receive radar sensor data from a plurality of sensors on the bicycle.

7. A radar sensor system for a bicycle, the radar sensor system comprising:
   a radar sensor housing mountable to the bicycle, the radar sensor housing including a radar sensor and a wireless transceiver coupled to the radar sensor; and
   a bicycle computer mountable to the bicycle, the bicycle computer including:
      a position-determining component for determining a current geographic position of the bicycle;
      a receiver for receiving radar sensor data from the wireless transceiver of the radar sensor housing, the radar sensor data including target data;
      a display; and
      a processor coupled with the position-determining component, the receiver, and the display, the processor configured to
      determine one or more situational awareness indicators associated with at least one target based on the received radar sensor data, and
      cause the display to simultaneously present (a) a navigation map corresponding to the current geographic position of the bicycle from the position-determining component and (b) the one or more determined situational awareness indicators,
   wherein the processor is configured to cause the display to provide a first situational awareness indicator when a first target is determined to be within a first distance from the bicycle based on the received radar sensor data,
   wherein the first situational awareness indicator is a tracking bar with a first icon illustrative of a determined location of the first target based on the received radar sensor data, the tracking bar extending substantially along one side of the display.

8. The radar sensor system as recited in claim 7, wherein the processor is configured to cause the display to provide a dynamic representation of the distance between the first target and the bicycle using the first icon illustrative of the first target and a second icon illustrative of the bicycle.

9. The radar sensor system as recited in claim 7, wherein the situational awareness indicator is a brightness or color of at least one portion of a first edge of the display or navigational information presented on the display to indicate an awareness level associated with a first target detected in proximity to the bicycle based on the radar sensor data.

10. The radar sensor system as recited in claim 9, wherein the processor is configured to:
- cause a change in brightness or color of the at least one portion of the first edge of the screen of the display or navigational information presented on the display when the received radar sensor data indicates a first target located in a first direction associated with the first edge; and
- cause a change in brightness or color of at least a portion of a second edge of the screen of the display or navigational information presented on the display when the received radar sensor data indicates a second target located in a second direction associated with the second edge.

11. The radar sensor system as recited in claim 7, wherein the processor is configured to cause the display to provide a time gap between the bicycle and a moving target detected in proximity to the bicycle based on the received radar sensor data.

* * * * *